(12) United States Patent
Puniyani et al.

(10) Patent No.: US 11,122,342 B2
(45) Date of Patent: Sep. 14, 2021

(54) SYSTEMS AND METHODS FOR PROVIDING CONTEXTUAL INFORMATION

(71) Applicant: Rovi Guides, Inc., San Jose, CA (US)

(72) Inventors: Aman Puniyani, Rohtak (IN); Ankur Anil Aher, Kalyan (IN); Jagadeswar Reddy Mettupalli, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/519,844

(22) Filed: Jul. 23, 2019

(65) Prior Publication Data
US 2021/0029418 A1    Jan. 28, 2021

(51) Int. Cl.
*H04N 21/8405* (2011.01)
*H04N 21/45* (2011.01)
*H04N 21/442* (2011.01)
*H04N 21/8545* (2011.01)

(52) U.S. Cl.
CPC ... *H04N 21/8405* (2013.01); *H04N 21/44222* (2013.01); *H04N 21/4532* (2013.01); *H04N 21/8545* (2013.01)

(58) Field of Classification Search
CPC .......... H04N 21/8405; H04N 21/4532; H04N 21/44222; H04N 21/8545
See application file for complete search history.

(56) References Cited

U.S. PATENT DOCUMENTS

| | | | |
|---|---|---|---|
| 7,761,892 B2 | 7/2010 | Ellis | |
| 8,046,801 B2 | 10/2011 | Ellis | |
| 10,057,630 B1 | 8/2018 | Panchaksharaiah | |
| 10,362,354 B2 | 7/2019 | Panchaksharaiah | |
| 2005/0251827 A1 | 11/2005 | Ellis | |
| 2006/0200842 A1 | 9/2006 | Chapman | |
| 2009/0231128 A1 | 9/2009 | Watson | |
| 2010/0005084 A1* | 1/2010 | Nguyen | H04N 5/44513 707/E17.014 |
| 2018/0069914 A1* | 3/2018 | Abebe | H04L 65/00 |
| 2018/0315094 A1* | 11/2018 | Ashoori | G10L 25/48 |
| 2019/0130917 A1* | 5/2019 | Pogorelik | G10L 15/26 |
| 2019/0236090 A1* | 8/2019 | Singh | G06F 16/41 |

* cited by examiner

*Primary Examiner* — Yassin Alata
(74) *Attorney, Agent, or Firm* — Haley Guiliano LLP

(57) ABSTRACT

Systems and methods are described herein for causing to be provided contextual information for a content item. The system identifies that a subject in a content item is currently being referenced and determines when the subject was last referenced in the content item. For example, the system identifies a king being discussed by characters in a television series and determines the king was referenced three months ago. The system determines, based on the last time the subject was referenced, whether to provide contextual information about the subject. Using the determined three-month lapse in time since the king was last referenced, the system determines that contextual information about the king should be provided. Accordingly, the system causes to be displayed the contextual information after determining contextual information should be provided.

15 Claims, 9 Drawing Sheets

SYSTEMS AND METHODS FOR PROVIDING CONTEXTUAL INFORMATION

BACKGROUND OF THE INVENTION

The present disclosure relates to a system for generating data, such as metadata, based on content item consumption for providing contextual information.

SUMMARY

Systems and methods are described herein for causing to be provided contextual information for a content item in a plurality of related content items. Consuming content items is increasingly customizable with content item providers seeking to distinguish themselves by creating personal content item consumption experiences unique to each user and with data storage readily available at nearly limitless capacities. From social video-hosting platforms creating personalized playlists of recommended videos based on a user's video history to video games allowing players to build a virtual life, users are generating petabytes of data each minute while consuming content items that can be expansive and detailed. It may be difficult for users to remember why something is relevant after a long period of time or after consuming a large amount of different content items. This can lead to frustrating content item consumption experiences having unclear subject references or time-consuming searches to recognize the context of content items, especially in light of how many sources and types of content items are available today.

The present disclosure addresses the problems described above by, for example, providing systems and methods for generating metadata to maintain associations among subjects referenced in a content item and determining to display a reminder having contextual information based on the metadata. For example, when a user playing a video game interacts with a non-player character to accept a quest, a context assistance system may generate metadata from this engagement. When the user interacts with a character or object related to the quest, the context assistance system may determine, using criteria such as time or context, to provide contextual information or a reminder about the contextual information. Accordingly, the systems and methods described herein provide a clearer content item consumption experience with relevant information that reduces the time a user may otherwise be searching for context instead of consuming content items.

Systems and methods are described herein for a context assistance system that determines to provide a reminder during consumption of a content item based on criteria applied references to associations among subjects over time. In some embodiments, the context assistance system identifies a reference to a subject (e.g., a non-player character) in a content item (e.g., a video game) at a current time. The context assistance system may determine when, in a collection of related content items (e.g., portions of the video game that the user has saved using progress save points), the identified subject was last referenced prior to the current time. Based on when the last reference was, the context assistance system may determine whether to provide contextual information about the identified subject (e.g., information about the non-player character). If the context assistance system determines to provide the contextual information, the context assistance system may cause the contextual information to be displayed.

In some embodiments, a context assistance system causes to be provided a reminder to a user playing a video game. The user chooses to initiate a quest given by a non-player character. The non-player character describes a blacksmith who must be found in order to construct the only sword able to defeat a powerful monster. This information relates to an association among subjects like the non-player character, the blacksmith, the sword, and the monster. The context assistance system detects these subjects and generates metadata for the user's profile associated with his or her gameplay progress that includes the information about the association among the subjects. During later gameplay, the user finds the blacksmith. The context assistance system detects the blacksmith and uses the generated metadata to determine that this blacksmith can construct the sword related to the quest received from the non-player character. Two years have passed since the user was involved in any gameplay related to the sword from the quest, and the context assistance system determines, based on the elapsed time, to provide information about the sword. When the user approaches the blacksmith for a conversation, the context assistance system causes a reminder to be provided that contains information about the sword needed to defeat the powerful monster. In this way, the context assistance system provides information without the user having to memorize every interaction ever made during gameplay.

It should be noted that the systems and methods described herein for one embodiment may be combined with other embodiments as discussed herein.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Systems and methods are described herein for causing to be provided contextual information and, more particularly, for reminding a content item consumer of associations among subjects previously referenced in a content item.

Figure 1A:
FIGS. 1A and 1B show an illustrative embodiment of a context assistance system providing context during content item consumption, in accordance with some embodiments of the disclosure.
Figure 1B:
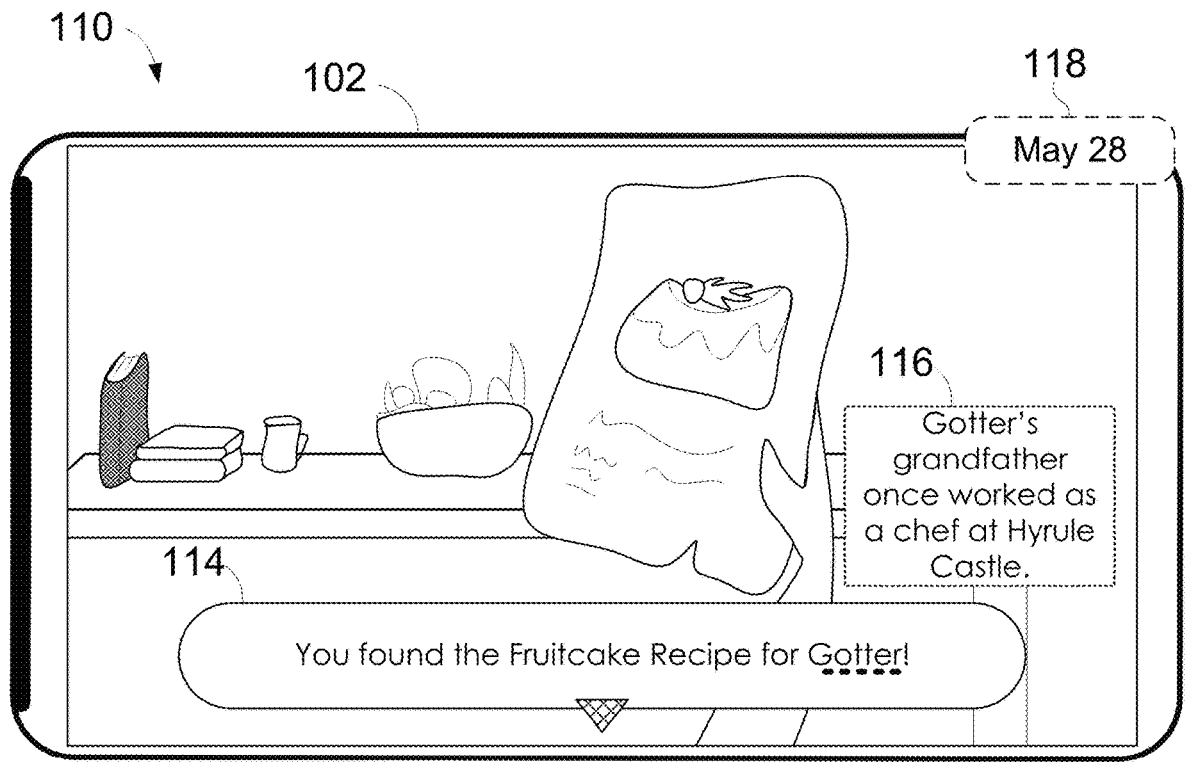

FIGS. 1A and 1B show an illustrative embodiment of a context assistance system providing context during content item consumption, in accordance with some embodiments of the disclosure. Content item instantiation 100 shows a portion of a content item (e.g., a video game) presented on device 102. Content item dialogue 104 containing contextual information 106 is presented to the user. The consumption of content item instantiation 100 is occurring at consumption time 108.

In some embodiments, content item consumption is associated with a user profile. For example, a video playing service maintains a history of videos that a user has watched, which is stored in an account or profile associated with the user. A video game system may also store the progress of a user, as the user plays the game, in an account or profile associated with the user. In some embodiments, a user profile is associated with user preferences, user behavior records, user priorities or importance values assigned to subjects of content items, any suitable user-created or user-defined property of a content item consumption experience, or any combination thereof.

A context assistance system may detect an association among subjects referenced in a content item being consumed by a user. The system may monitor content items for associations among referenced subjects of the content item continuously, periodically according to a preset or dynamically determined period, or in response to a trigger event. For example, a video game is presented on device 102 at content item instantiation 100. The context assistance system may operate through control circuitry, as will be described in detail in the description of FIG. 4. The subjects referenced in the content item may include characters, avatars of users, objects, places, events, dates, any suitable topic presented in a content item, or any suitable combination thereof. In some embodiments, the content item may present characters, objects, and dialogue on a device. For example, content item instantiation 100 presented on device 102 shows characters Link and Gotter, objects such as trees, and content item dialogue 104, which is presented as being spoken by Gotter. In some embodiments, an association among at least two subjects is established based on the presence of the at least two subjects being provided for display. For example, the context assistance system detects an association between Link and Gotter because they are both provided for display in content item instantiation 100. In some embodiments, the context assistance system may detect an association between Gotter and a recipe because the character Gotter and the word "recipe" are identified as being provided for display. In some embodiments, the association is predetermined by the content item provider, and the context assistance system queries a database of associations using a fingerprint of the current content item instantiation. For example, Nintendo may have an association between Gotter and a recipe in a database of associations that can be accessed by the context assistance system as the user progresses through the game to content item instantiation 100.

The context assistance system may generate metadata that includes information about one or more associations among the determined subjects. The metadata may be generated by the context assistance system, provided by the content item provider or a third party, or a combination thereof. For example, the context assistance system generates the metadata based on image processing of subjects provided for display on a screen to identify the subjects (e.g., facial recognition for animated characters or optical character recognition (OCR) for linguistic characters). In content item instantiation 100, the context assistance system may use facial recognition to identify characters Link and Gotter and use OCR to identify that Gotter, in content item dialogue 104, is telling Link that his grandfather was a chef. Both the character identities and the information about the characters may be metadata that is generated by the context assistance system to be provided during later gameplay. In some embodiments, the context assistance system generates metadata based on subjects identified by a username or handle. For example, the context association system uses handles on an Internet forum to determine users participating in a conversation. In some embodiments, a content item provider may provide predetermined content item data to the context assistance system. For example, Nintendo maintains a database of content item data generated for each possible content item instantiation (e.g., the text of a non-player character's speech in a dungeon map) and, as a user is consuming content item instantiation 100, the context assistance system queries Nintendo's database for data for content item instantiation 100. The context assistance system may generate metadata associated with the user profile containing the content item provider's data. The context assistance system may generate metadata through a combination of metadata generation and receiving content item data from content item providers. For example, the context assistance system may use image processing to identify that Link, Gotter, and the word "chef" are being provided for display currently. The context assistance system may then use the subjects detected to query a database maintained by the content item provider for data related to Link, Gotter, and chefs to find that Gotter's grandfather was once a chef. The generated metadata may include information about the association among the referenced subjects. For example, the metadata generated includes an association among Gotter, Link, and a recipe because the metadata including contextual information 106 indicates that Gotter told Link about a recipe that belonged to his grandfather, a chef at Hyrule castle. In some embodiments, the generated metadata includes the date when the association was first consumed or last consumed. For example, the context assistance system maintains records that the association between Link and Gotter in content item instantiation 100 was consumed at consumption time 108 of January 16.

The context assistance system generates information about the association that, in some embodiments, includes a consumption indicator that acts as a flag indicating that the subjects of the association have been presented to or consumed by the user. In some embodiments, the context assistance system generates information about the association that includes an importance level of the association. The importance level may be provided by the content item provider or determined by the system based on a user profile.

For example, the association among Link, Gotter, and a recipe may be classified by the content item provider as an association with high importance because the recipe is necessary to defeat a major opponent in the video game. The association may alternatively be classified by the context assistance system as having a low importance because the user profile deems that quests related to side characters like Gotter are not what he or she wants to focus on while playing the video game.

In some embodiments, the context assistance system determines associations that are not predetermined by the content item provider. For example, subjects and associations among subjects in video games such as "The Sims" are created by the user. "The Sims" is a certification mark owned by Electronic Arts Inc. For "The Sims," a user creates people, furniture, the relationships between the people, and the relationships between the people and the furniture (e.g., user-created avatar Taylor owns a red sofa). The context assistance system may generate the association among subjects in "The Sims" without pre-defined associations from Electronic Arts Inc. when the user has created the associations himself or herself.

The context assistance system may detect a reference to subjects previously detected during the course of consumption. The system may monitor content items for references to subjects of the content item continuously, periodically according to a preset or dynamically determined period, or in response to a trigger event. In some embodiments, the context assistance system detects subjects by using image processing, audio processing, video processing, or any combination thereof. For example, the context assistance system, during content item instantiation 110, detects subjects "Gotter" and "recipe" as being provided for display on device 102 through content item dialogue 114 at consumption time 118 using image processing (e.g., OCR). In some embodiments, the context assistance system detects subjects based on metadata provided from content item providers. For example, Nintendo includes identifier metadata associated with gameplay that allows the context assistance system to identify that Gotter's recipe is present in content item instantiation 110.

The context assistance system may determine, using information about an association among referenced subjects, that the association among the subjects was previously referenced. In some embodiments, the context assistance system uses a database of associations to determine that the association among the subjects was previously referenced. The database may include a consumption indicator for the association indicating that the association has been consumed by the user. The context assistance system may determine that the detected subjects were previously referenced based on a database of detected subjects. In some embodiments, the context assistance system maintains a record of subjects encountered and can verify a subject has previously been referenced by the subject's existence in the record. For example, the context assistance system maintained a record of the user's previous consumption of the association among Gotter, Link, and the recipe at consumption time 108 using the user profile associated with the "Legend of Zelda" gameplay. "The Legend of Zelda" is a certification mark owned by Nintendo of America Inc. All characters and likenesses of "The Legend of Zelda" referenced belong to Nintendo of America Inc. In some embodiments, a consumption indicator is a flag used to mark a subject as previously referenced. At consumption time 108, a consumption flag may have been activated or generated by the context assistance system for the association among Link, Gotter, and the recipe. The context assistance system may maintain a record of all possible subjects within a content item and marks subjects as consumed or referenced as the user consumes instantiations in which respective subjects are referenced. For example, at consumption time 108, the context assistance system adds subjects "Gotter," and "Gotter's recipe" to a record of consumed subjects. The context assistance system later verifies, at consumption time 118, that the detected subjects "Gotter" and "Gotter's recipe" have already been referenced because they are on the record of consumed subjects. In some embodiments, the context assistance system uses the determination that the subjects have been previously referenced to also determine that an association among the respective subjects was also referenced. For example, after identifying that Link, Gotter, and Gotter's recipe were previously referenced, the context assistance system queries an association database for associations with the subjects. The existence of the association in the user profile metadata in combination with the subjects being previously referenced may allow the context assistance system to determine the association was also previously referenced. The association stored in the association database may also be associated with a time stamp of the last reference. For example, at consumption time 118 of content item instantiation 110, the context assistance system may determine that the association among Link, Gotter, and Gotter's recipe was referenced and at consumption time 108 because both the association and the time are stored in the user profile metadata.

The context assistance system may determine to provide, based on a criterion, a reminder regarding previously consumed content items. In some embodiments, the criterion allows the context assistance system to determine the relevancy or appropriateness of providing the reminder regarding previously consumed content items. The previously consumed content item may comprise the referenced association among previously referenced subjects. Using the criterion may comprise applying a criterion based on time, context, a user profile, or any suitable combination thereof.

In some embodiments, the criterion that the context assistance system applies is based on time. The context assistance system may use a time difference between times that an association, a subject, or both was referenced. For example, an association among Link, Gotter, and Gotter's recipe, subjects shown in content item instantiations 100 and 110, is referenced at consumption times 108 and 118, respectively. The time difference between consumption times 108 and 118 may be used with a predetermined threshold. For example, a threshold time of 2 months is used for the context assistance system to remind a user of an association that he or she has not been shown for at least 2 months. Accordingly, at consumption time 118 of May 28, if content item instantiation 110 was the first time since consumption time 108 that the association among Link, Gotter, and Gotter's recipe was referenced to the user, the time difference between when the association was referenced is greater than the threshold of 2 months.

In some embodiments, the criterion that the context assistance system applies is based on context in which references to subjects, associations, or both are made. The context assistance system may compare the context of the previously consumed content item to the context of currently consumed content items. For example, context of an episode of the TV show "Game of Thrones" includes the storyline of an earlier episode that explains why two characters are having a discussion in secrecy. "Game of Thrones" is a certification mark owned by Home Box Office, Inc. If two different scenes share a similar context, the context assistance system may consider a criterion satisfied. For example, characters meeting in secret to discuss Jon Snow's true ancestry share the context of an earlier episode in which Jon Snow discovers who his real parents are. In some embodiments, the context assistance system determines context based on metadata provided by the content item provider. A content item provider may provide background information about an episode of a series of content items in the form of a summary recapturing what has happened in earlier episodes, access to the writers' screenplays of each episode in the series, any suitable metadata that describes the context of each scene, or any combination thereof. The context assistance system may, from the provided information, determine context relevant to a content item that is being presented for consumption. For example, the context assistance system parses an HBO-provided "Game of Thrones" summary containing who Jon Snow's parents are to determine that the context of a scene in "Game of Thrones" is that the characters are arguing in the aftermath of Jon Snow's ancestry being revealed. The context assistance system may determine context from background information compiled over third-party forums and publicly maintained encyclopedias. For example, the context assistance system accesses the forums of the Internet Movie Database (IMDb) with forum members discussing a certain episode of "Game of Thrones" to determine the context of a scene of the episode by analyzing text of forum posts that have been tagged with the episode in discussion. The context assistance system may determine context using previously generated background information in combination with identifying the subjects referenced in content items. For example, the system uses audio processing to identify the speakers in two different audio blogs (e.g., podcasts) consumed by a user who are discussing Tiger Woods and his professional achievements. The context assistance system may determine that the context of both podcasts is the 2019 Masters Tournament since his rare victory triggered both of the audio blogs' discussions.

In some embodiments, the criterion that the context assistance system applies is based on a user profile. A user profile may include user preferences and records of user behaviors. In some embodiments, the context assistance system applies a criterion based on a user preference. For example, the user profile indicates that the user is interested in the character Gotter in "The Legend of Zelda" video games. In turn, the context assistance system, when detecting that an association involving Gotter has been referenced in a previous consumption of the video game, applies the user preference for Gotter when determining whether to present a reminder about the association. In some embodiments, the context assistance system applies a criterion based on an analysis of user behavior. User behavior may include patterns of user inputs into the device, dialogue associated with the user profile (e.g., text within a chat system), content item consumption history, content item purchase history, any suitable user interaction when consuming or for consuming content items, or any combination thereof. In some embodiments, the context assistance system detects patterns in the user input and generates metadata associated with the detected patterns. For example, the context assistance system detects that a user playing a video game has pressed a sequence of buttons on a game controller that corresponds with a special action taken by the user's avatar in the video game and applies a criterion based on the user's input. In some embodiments, the context assistance system uses chat history to establish the criterion. For example, the context assistance system determines that a first user has responded to a second user's post in an online forum about "The Legend of Zelda" having the text "Gotter's recipe" and applies a criterion based on the chat record between the first and second users. In some embodiments, the context assistance system applies a criterion based on content item consumption history. For example, a user profile indicates that a user has a consumption history that is predominantly videos about technology gadget reviews. The context assistance system may apply a criterion based on consumption history such that, when the user watches another technology gadget review, a reminder having information about a previously viewed review video of the same gadget is provided. In some embodiments, the context assistance system applies a criterion based on purchasing history. For example, a user playing a video game with in-game purchases (e.g., buying upgrades with real currency) is using the last of the arrows he or she had previously purchased. The context assistance system may cause to be provided a reminder having information from the purchase history after applying the criterion that a reminder should be provided when an item on the purchase history is almost used up.

The context assistance system may cause to be provided the reminder. In some embodiments, the reminder includes a playback icon for playing back the content item previously consumed. For example, the context assistance system causes to be provided a reminder with contextual information 116 and a playback icon that, when selected by the user, shows a playback of the user's gameplay surrounding content item instantiation 100 at consumption time 108. In some embodiments, the reminder includes a feedback icon for providing feedback to improve the content of the reminders. For example, the context system causes to be provided a selectable feedback icon (e.g., a row of stars or a thumbs-up) displayed with contextual information 116 such that a user, by selecting the icon (e.g., selecting a number of stars), submits feedback to the context assistance system indicative of the quality or interest in the contextual information (e.g., selecting all of the stars to indicate that contextual information 116 was helpful). In some embodiments, the reminder may be caused to be displayed simultaneously and on the same screen on which the content item is provided. For example, the reminder containing contextual information may be displayed in a parenthetical that is in-line with closed captions of a movie. In some embodiments, the reminder having contextual information about the association can also be displayed as a pop-up (e.g., contextual information 116 is displayed in a separate box overlaid on content item instantiation 110).

As referred to herein, the terms "media asset," "content," and "content item" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, playlists, electronic books, social media, applications, games, discrete portions of video games bounded by saves of the game file, and/or any other media and/or combination of the same. Content items may be recorded, played, displayed or accessed by devices, but can also be part of a live performance. Content item providers may refer to cable sources, satellite providers, on-demand providers, Internet providers, over-the-top content item providers, or other sources of content items. As referred to herein, a "device" should be understood to mean a smartphone, tablet, virtual reality headset, television, any electronic device for content item consumption, or any suitable combination thereof. As referred to herein, an "instantiation" of a content item is manifestation of the content at a single time instance, which may include a video frame, an audio product, a digital fingerprint associated with the manifestation, any suitable representation of the content item at a single time instance, or any combination thereof.

Figure 1C:
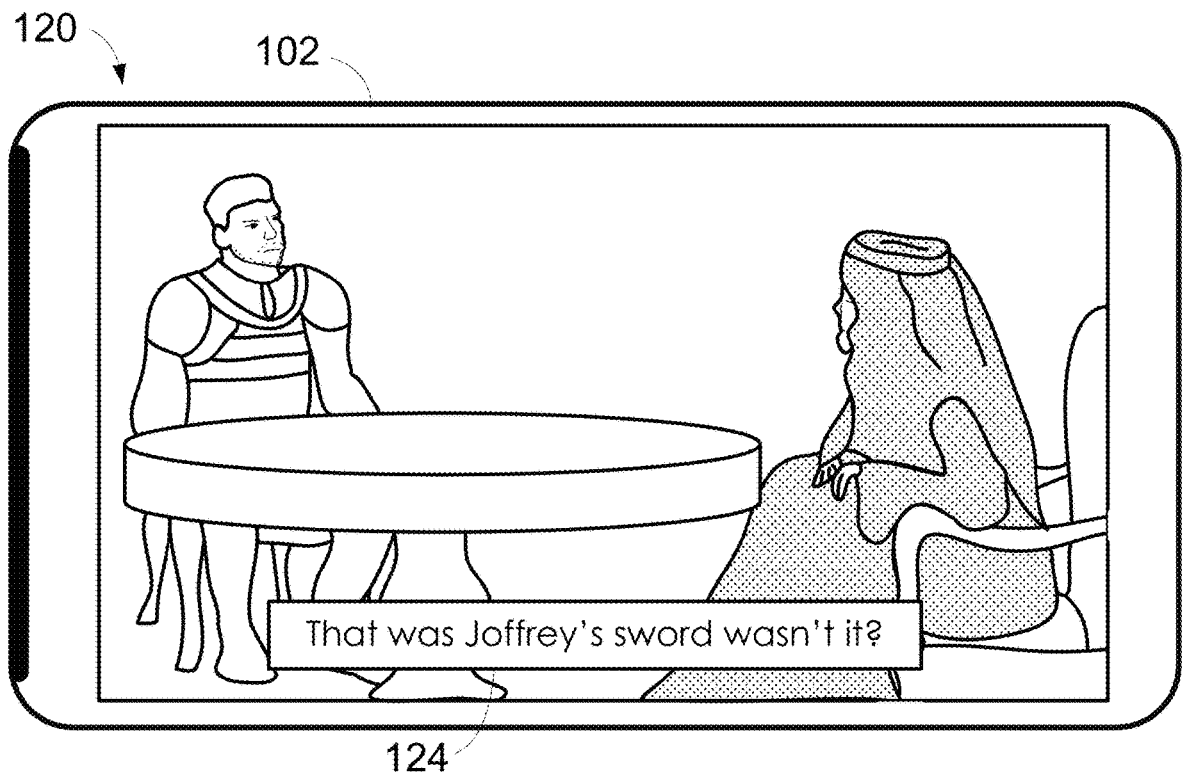
FIGS. 1C and 1D show an illustrative embodiment of a context assistance system providing context within closed captioning during content item consumption, in accordance with some embodiments of the disclosure.
Figure 1D:
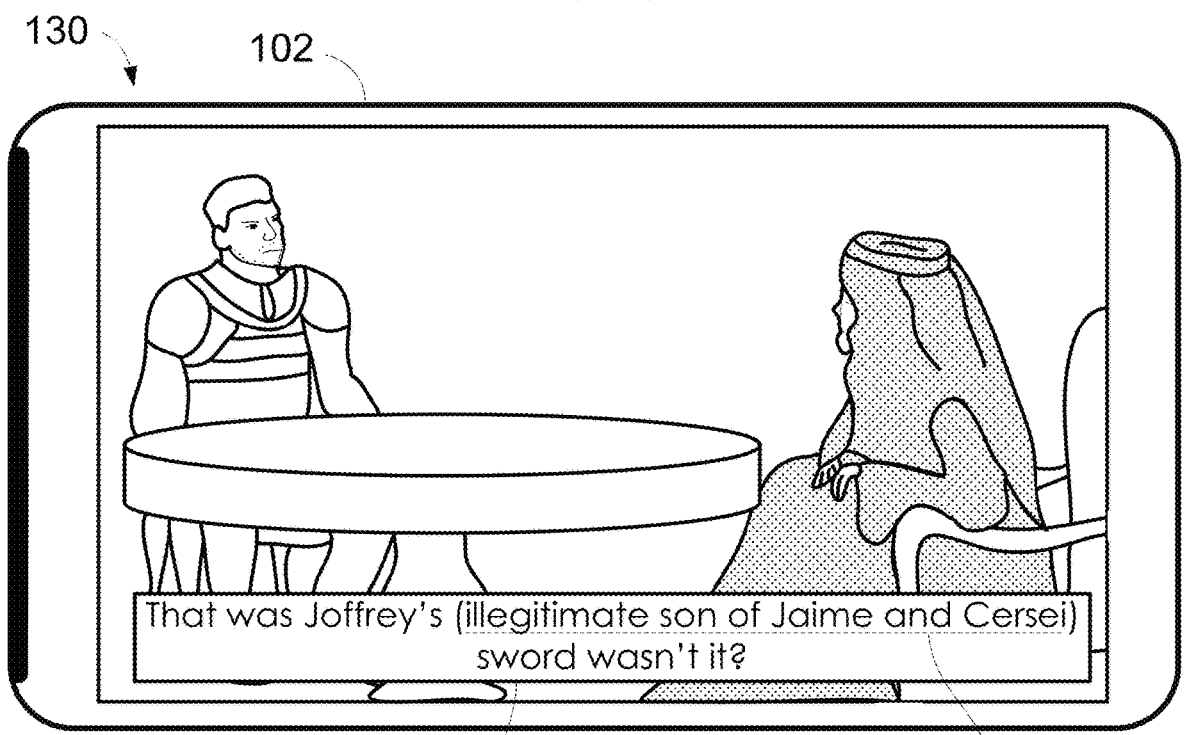

FIGS. 1C and 1D show an illustrative embodiment of a context assistance system providing context within closed captioning during content item consumption, in accordance with some embodiments of the disclosure. Content item instantiation 120 shows a portion (e.g., a scene) of a content item (e.g., an episode of a television series) presented on device 102. Content item dialogue 124 (e.g. closed captioning) having no contextual information is presented to the user. Content item instantiation 130 shows the scene of the episode having contextual information 136 provided within content dialogue 134 of the episode.

Content item instantiation 120 shows a scene of "Game of Thrones" where characters Jaime Lannister and Olenna Tyrell are discussing a sword formerly belonging to character Joffrey Baratheon. In content item instantiation 120, contextual information is not provided simultaneously with the episode. No contextual information may be provided when the user has selected, through a setting on an associated user profile, for the context assistance system to not provide contextual information during presentation of content items.

In content item instantiation 130, contextual information 136 is provided simultaneously with the episode. Specifically, contextual information 136 is provided within the closed captioning of content dialogue 134. In some embodiments, the context assistance system determines a subject in the content item being referenced in the content item being provided at a current time. For example, in content item instantiation 130, the context assistance system determines that Joffrey is being referenced in the scene of "Game of Thrones" with Jaime and Olenna having a conversation. The context assistance system may determine the subject through an analysis of the closed captioning provided by, for example, the content provider (e.g., HBO). Through an analysis of the proper nouns within the closed captioning, the context assistance system may determine that Joffrey is a subject being referred to in content item instantiation 130. In some embodiments, the context assistance system may determine that the consumption associated with the user profile of the content item is capable of being enhanced based on the subject. For example, the context assistance system determines that the episode of "Game of Thrones" shown in FIG. 1C is capable of being enhanced based on reference to Joffrey. The context assistance system may determine consumption is capable of being enhanced using a measure of time, episode count (e.g., 9 episodes have passed between the current and prior reference to Joffrey), reference count (e.g., a total of 250 intervening subject references have been accounted for between the current and prior reference to Joffrey), or any suitable measurable quantity separating references of a subject. For example, a user profile associated with the "Game of Thrones" consumption indicates that Joffrey was last referenced to a user 2 years ago. Using the elapsed time associated with the subject being referenced, the context assistance system may then determine that the consumption of "Game of Thrones" would be enhanced by providing contextual information relevant to Joffrey, as shown in FIG. 1D, within the closed captioning of the episode.

Figure 2:
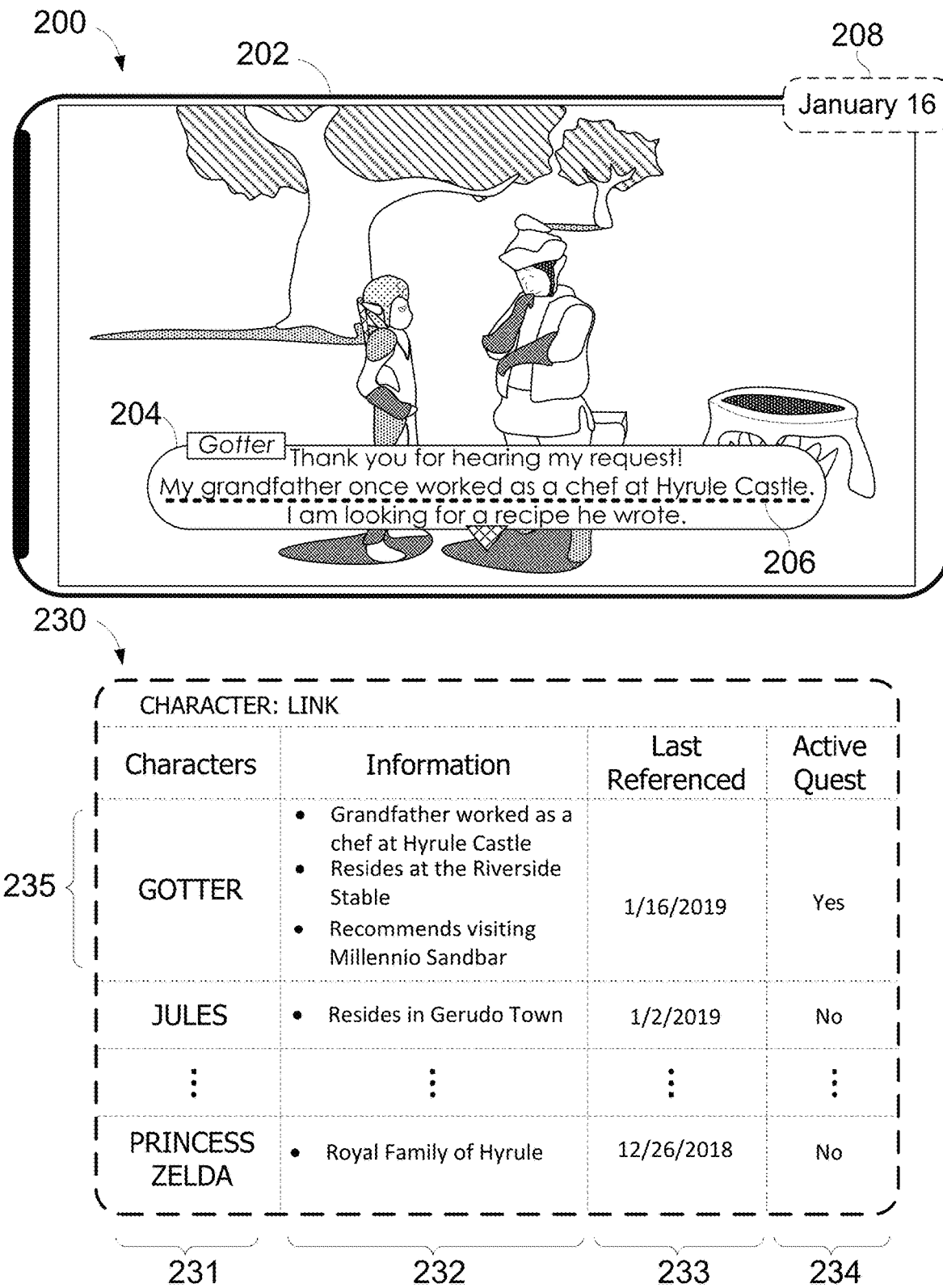
FIG. 2 shows an illustrative embodiment of a context assistance system generating metadata, in accordance with some embodiments of the disclosure.

FIG. 2 shows an illustrative embodiment of a context assistance system generating metadata, in accordance with some embodiments of the disclosure. A content item at content item instantiation 200 is provided for consumption on device 202 at consumption time 208. Content item dialogue 204 between characters in the content item contains contextual information 206, which may be used by the context assistance system when generating metadata for the user profile. The context assistance system may operate through control circuitry, as will be described in detail in the description of FIG. 4.

The context assistance system may maintain a list of subjects as they are referenced in a content item. For example, a user playing "The Legend of Zelda" is introduced to characters Princess Zelda, Jules, and Gotter, in that order, as progress is made in gameplay. Accordingly, the context assistance system adds Gotter after Jules and Jules after Princess Zelda to a list of referenced subjects. Metadata 230 shows an exemplary data structure that includes a list of subjects that have been referenced in the video game. Metadata 230 includes character list 231, content item information 232, reference times 233, and supplemental association information 234. In some embodiments, character list 231 is a complete list of all subjects capable of being referenced in a content item (e.g., all characters, places, and events in a movie). A context assistance system may, when complete subject lists are used, implement consumption indicators that flag if a subject has or has not been referenced to a user. Content item information 232 may be generated according to user interactions taken during content item consumption. For example, a user playing "The Legend of Zelda" would not know that Gotter's grandfather worked as a chef at Hyrule Castle unless he or she chose to accept the quest offered by Gotter. In some embodiments, content item information 232 includes information about associations between subjects. Content item information 232 may be linked to character list 231 because the subject in question is a character in character list 231. For example, in character-specific metadata 235, "grandfather worked as a chef at Hyrule Castle" is information about the association between Gotter and Gotter's recipe. This information is linked with the character "Gotter" in character list 231. As depicted in FIG. 2, the context assistance system has generated reference times 233 and supplemental association information 234 in metadata 230. For example, character-specific information 235 includes links between the date Jan. 16, 2019 in reference times 233 and a "yes" flag in supplemental association information 234. Reference times 233 may be a list of times when a subject was last referenced. For example, at consumption time 208, the character "Gotter," currently being referenced on device 202, is reflected on metadata 230 as being last referenced at a time of Jan. 16, 2019 to the user having the user profile associated with metadata 230.

In some embodiments, the context assistance system maintains supplemental association information such as supplemental association information 234 indicative of whether a quest associated with the character in metadata 230 in the video game is active. Supplemental association information may include importance levels or weights of the respective associations. The importance levels may be fixed or dynamic. Content item providers may establish a fixed value for the weight. The importance levels may be dynamic based upon user behavior such as user interactions with a content item (e.g., the frequency at which a user visits a map of a video game or the number of fast-forward requests in a movie), content item consumption patterns (e.g., a user has consumed consecutive videos about "Game of Thrones"), any suitable user behavior indicating preference related to content items, or any combinations thereof. In some embodiments, the context assistance system maintains the importance levels through weights of connections between nodes in a knowledge graph. The nodes of the knowledge graph may be subjects and the connections of the knowledge graph may be the associations between them.

Figure 3:
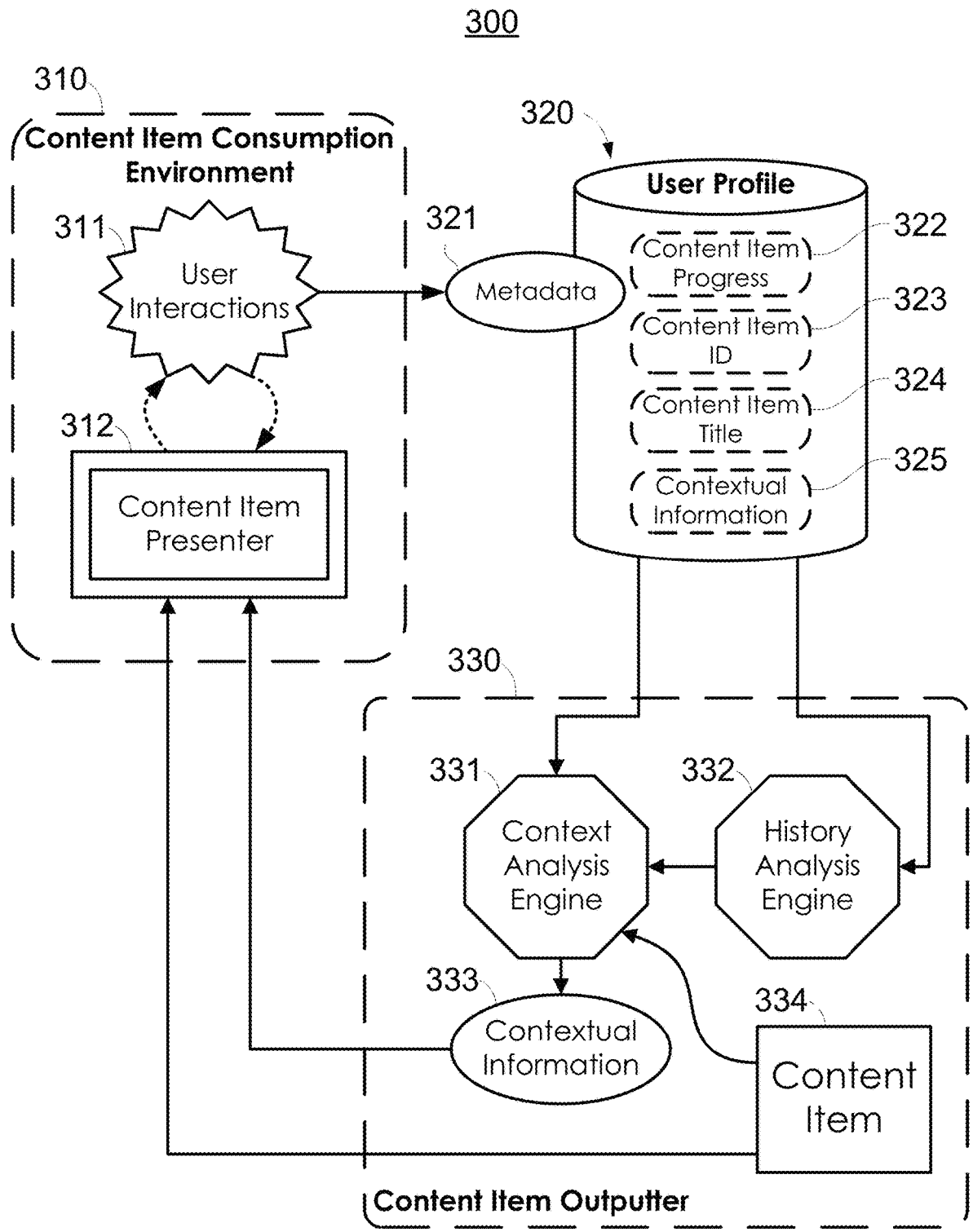
FIG. 3 shows a block diagram of an illustrative context assistance system, in accordance with some embodiments of the disclosure.

FIG. 3 shows a block diagram of an illustrative context assistance system, in accordance with some embodiments of the disclosure. Devices 102 and 202 may use context assistance system 300 to cause to be provided reminders about associations among subjects within a content item. Content item consumption environment 310 may include a content item presenter 312 that engages with user interactions 311 through direct communications (e.g., touchscreen and voice commands) or indirect communications (e.g., a game controller or remote control). From user interactions 311, context assistance system 300 may generate metadata 321 to be associated with user profile 320. In exemplary context assistance system 300, user profile 320 includes content item progress 322, content item ID 323, content item title 324, and contextual information 325. Each content item associated with user profile 320 may have its own record of progress, identification, title, and contextual information. Context analysis engine 331 and history analysis engine 332 of content item outputter 330 use data from user profile 320. In some embodiments, history analysis engine 332 uses data from user profile 320 to determine that associations were referenced during previous consumption of the content item. Context analysis engine 331 may use the determinations made by history analysis engine 332, data from user profile 320, and content item 334 to determine what contextual information should be provided, at a certain time of content item consumption, in a reminder to be caused for display in content item presenter 312 along with content item 334.

Content item consumption environment 310 may include content item presenter 312 that engages with user interactions 311. In some embodiments, content item presenter 312 is a device, website, video player, gaming platform, any suitable medium for presenting electronically consumable assets and receiving user interactions, or any combination thereof. Content item presenter 312 may receive user interactions directly from a user (e.g., through a touchscreen for tactile inputs or through a microphone for vocal inputs) or indirectly from a user (e.g., through an antenna for radio frequency inputs or network ports for cable inputs). In some embodiments, user interactions 311 include commands controlling content item presenter 312 or providing input to context assistance system 300. For example, user interaction 311 includes a user selecting a playback icon in the reminders provided by context assistance system 300 such that a video of a previously consumed content item is displayed on content item presenter 312. In some embodiments, user interactions 311 include engagement with a content item presented on content item presenter 312. For example, a user playing a video game uses the touchscreen on content item presenter 312 (e.g., the screen of a tablet) to control a video game avatar and interact with subjects in the video game.

User profile 320 may be associated with a user consuming a content item. In exemplary context assistance system 300, user profile 320 contains content item progress 322, content item ID 323, content item title 324, and contextual information 325. A user profile associated with a context assistance system may include user preferences, content item consumption history, user credentials, content item information, any suitable information or parameter associated with a user or a content item, or any combination thereof. User profile 320 receives metadata based on user interactions 311. Metadata 321 may be transmitted to the user profile from content item presenter 312, an intermediary device (e.g., a remote control), or any combination thereof. User profile 320 may be associated with metadata 230, which further includes the associations between subjects and indicators of content item progress.

Metadata 321 may include an association between subjects, an indicator that subjects were detected, a time subjects were detected, any suitable information pertaining to a content item that was generated or triggered based on user interaction 311, or any suitable combination thereof. For example, content item instantiation 100 and the respective user interactions with the instantiation allow context assistance system 300 to generate metadata such as a reference to Gotter, the time Gotter was referenced (e.g., consumption time 108), the acceptance or initiation of a quest, and plotline information (e.g., Gotter's grandfather once worked as a chef at Hyrule Castle). Metadata 321 may be uniquely associated with user profile 320 or commonly associated with multiple user profiles of different users. In some embodiments, a content item allows a user to generate user-specific metadata that is unique to the user. For example, a user playing "Minecraft" creates a home unique to the user, which results in metadata such as the quantities of certain materials used in crafting the user's home. In some embodiments, content item providers provide pre-generated metadata that context assistance system 300 has access to. For example, the association between characters Gotter and Link may be common among all players of "The Legend of Zelda" who have accepted Gotter's request to find a missing recipe.

Content item progress 322 may include records of content items consumed (e.g., a history of watched videos), portions of content items consumed (e.g., 20 minutes of an hour-long movie), user-defined content items (e.g., video game activity taken between times when the user saves the video game's file), any suitable discrete record of consumed content items, or any combination thereof. Content item ID 323 and Content item title 324 may be identifiers to associate other items (e.g., content item progress 322 and contextual information 325) in user profile 320 with the respective content item. For example, content item ID 323 associated with the content item provided for consumption on device 102 at content item instantiation 100 may be a serial number generated by Nintendo that is associated with the copy of "The Legend of Zelda" being played. Similarly, content item title 324 associated with the content item may be "The Legend of Zelda." Contextual information 325 may be information generated or obtained based on content items. For example, contextual information 325 based on content item instantiation 100 includes the information that Gotter's grandfather once worked as a chef at Hyrule Castle, which is obtainable directly from the content item. Contextual information 325 based on content item instantiation 100 may include information about Gotter's recipe that is obtained from a supplemental database that may be either provided by the original content item provider or a third party. For example, context assistance system 300 searches an online encyclopedia that Nintendo provides over an Internet connection for the fact that Gotter's recipe can be either a fruitcake recipe or a monster cake recipe. The context assistance system may also search a third-party database (e.g., a fan-operated forum about "The Legend of Zelda") to determine that Gotter's recipe is either for fruitcake or monster cake. Although not depicted in FIG. 3, respective communicative links between context assistance system 300 and content item providers, third-party databases, and any suitable content item information Internet repository may exist.

Content item outputter 330 causes to be provided to content item presenter 312 both content item 334 and contextual information 333. In some embodiments, the functions of content item outputter 330 are performed by hardware such as control circuitry and processing circuitry, as described in the descriptions of FIGS. 4-5. Data from user profile 320 may be used by context analysis engine 331 and history analysis engine 332 to determine contextual information 333 that may be displayed with content item 334. Context analysis engine 331 and history analysis engine 332 may be implemented by separate hardware components (e.g., by a combination of control circuitry within a device and control circuitry on a remote processing server) or a single hardware component (e.g., control circuitry within a device).

History analysis engine 332 may determine, using data from user profile 320, that associations among subjects in a content item have been previously referenced. For example, metadata 321 containing a record of consumption time 118 is compared to previously generated metadata containing a record of consumption time 108 to determine that, at consumption time 118, the association between subjects Gotter and Gotter's recipe had been referenced previously. History analysis engine 332 may determine that consumption time 108 was the last time the association was referenced. History analysis engine 332 may determine a subject clarification value based on the user's content item consumption history. In some embodiments, a subject clarification value represents a degree to which clarification is needed for an association among subject matters in a content item. In some embodiments, a subject clarification value depends on a time difference, content item difference (e.g., the content item difference between "Star Wars" Episode I and IV is 2 because there are two movies between them), any suitable measure of separation between references to associations between content items, or any combination thereof. For a TV series, the subject clarification value may depend on the episode difference between references to associations among subjects in the TV series. For example, an association between Jaime and Joffrey Lannister, characters in the TV series "Game of Thrones," is referenced in the second episode of the fourth season ("S4E2") of "Game of Thrones" and is next referenced, according to the sequential nature of the episode arrangement, in the third episode of the seventh season ("S7E3"). History analysis engine 332 may determine smaller subject clarification values as the episode difference between references to associations among Jaime and Joffrey decreases. For example, the reference of Jaime and Joffrey's association immediately following S7E3's reference is in the fourth episode of the seventh season ("S7E4"). The subject clarification value based on the 1-episode difference will be smaller than the value based on a 31-episode difference between S4E2 and S7E3. The time difference between current and prior references to associations consumed by a user may be a factor in the determination of the subject clarification value. In some embodiments, the greater the time since the association was last referenced to a user, the greater the subject clarification value that history analysis engine 332 determines. For example, history analysis engine 332 determines a smaller subject clarification value for a user who is rapidly consuming (e.g., binge-watching) "Game of Thrones" and has watched S4E2 of "Game of Thrones" 4 days before currently watching S7E3 than for a user who watched S4E2 3 months before currently watching S7E3.

A subject clarification value may be calculated based on a combination of episode difference and time difference between association references. For example, history analysis engine 332 calculates the absolute difference between the 31-episode episode difference and the 4-day time difference between references to the Jaime-Joffrey association. This absolute difference may be the absolute difference between 31 and 96 hours, which is 65 hours. Sixty-five hours may be small compared to a subject clarification value calculated based on a 31-episode difference and a 4-month time difference. Such an absolute difference may be the absolute difference between 31 and 2,976 hours, which is 2,945 hours. In some embodiments, a higher subject clarification value is indicative of a greater likelihood that context assistance system 300 will provide contextual information 333. Accordingly, a subject clarification value based on 2,945 hours, a value that is higher than a subject clarification value based on 65 hours, is more likely to cause context assistance system 300 to provide contextual information 333.

Context analysis engine 331 may use data from user profile 320, the output of history analysis engine 332, and content item 334 to determine contextual information 333 and whether to provide contextual information 333. In some embodiments, user profile 320 contains metadata structured similarly to metadata 230. Context analysis engine 331 may use the information about associations among subjects in metadata 230 when determining what contextual information to provide in contextual information 333. For example, context analysis engine 331 may determine that "Grandfather worked as a chef at Hyrule Castle" of character-specific metadata 235 is the contextual information appropriate to include in contextual information 333. This determination may be based on content item 334 and the output of history analysis engine 332. If a portion of content item 334 is generated at content item instantiation 110, context analysis engine 331 may detect subjects "Recipe" and "Gotter" from image processing of content item dialogue 114 when determining the appropriate contextual information from metadata 230 to include in contextual information 333. In some embodiments, the output of history analysis engine 332 allows context analysis engine 331 to determine whether or not contextual information 333 should be provided. If the output of history analysis engine 332 is indicative that a reminder of contextual information is not needed, then context analysis engine 331 may determine not to provide contextual information 333. This determination may be based upon a subject clarification value.

In some embodiments, context analysis engine 331 receives a subject clarification value from history analysis engine 332 to determine whether to provide contextual information 333. Context analysis engine 331 may use a predetermined threshold to compare with the calculated subject clarification value. For example, a predetermined threshold of 7 days or 168 hours leads context analysis engine 331 to determine that a subject clarification value associated with an absolute difference of 65 hours does not warrant contextual information 333 to be provided. Alternatively, a subject clarification value associated with an absolute difference of 2,945 hours, when compared to the predetermined threshold of 168 hours, may warrant contextual information 333 to be provided.

Figure 4:
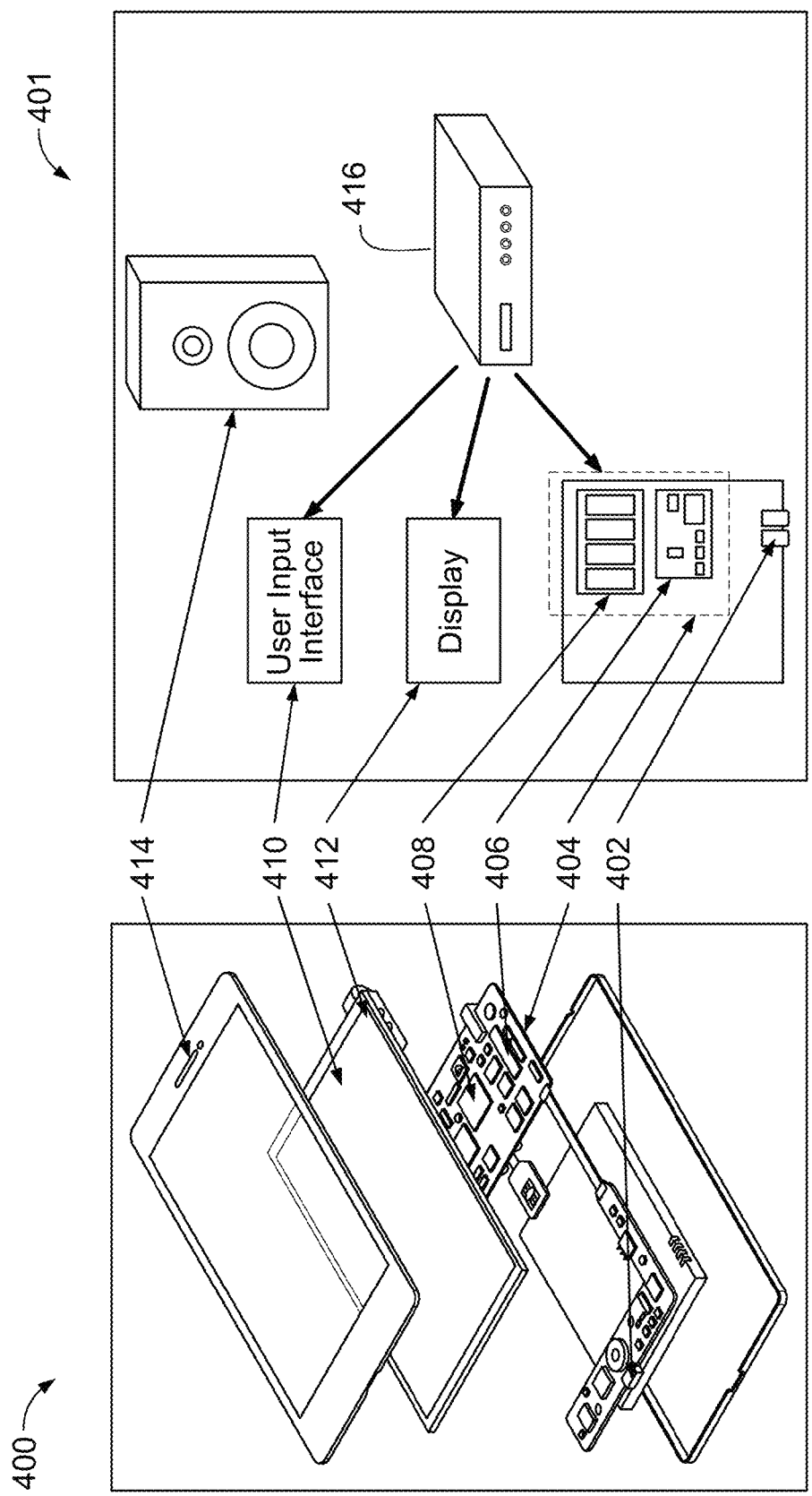
FIG. 4 shows a block diagram of an illustrative device, in accordance with some embodiments of the disclosure.

Users may access content items from one or more of their devices. FIG. 4 shows generalized embodiments of a device capable of presenting content items on a display 412. For example, display 412 may belong to a smartphone device. In another example, display 412 may belong to a user television or gaming equipment system. User television or gaming equipment system with display 412 may include a set-top box 416. Set-top box 416 may be communicatively connected to speaker 414, and display 412. In some embodiments, display 412 may be a television display or a computer display. In some embodiments, set top box 416 may be communicatively connected to user interface input 410. In some embodiments, user interface input 410 may be a remote-control device. Set-top box 416 may include one or more circuit boards. In some embodiments, the circuit boards may include processing circuitry, control circuitry, and storage (e.g., RAM, ROM, Hard Disk, or Removable Disk). In some embodiments, circuit boards may include an input/output path. More specific implementations of devices are discussed below in connection with FIG. 5. Each one of device 400 and user equipment system 401 may receive content items and data via input/output (hereinafter "I/O") path 402. I/O path 402 may provide content items (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (e.g., storage 408). Specifically, control circuitry 404 may be instructed by the application to perform the functions discussed above and below. For example, the application may provide instructions to control circuitry 404 to detect an association among subjects referenced in a content item, generate metadata containing information about the association, and cause to be provided reminders about the association during future content item consumptions that reference the association. In some implementations, any action performed by control circuitry 404 may be based on instructions received from the application.

In client-server based embodiments, control circuitry 404 may include communications circuitry suitable for communicating with a context assistance system server or other networks or servers. The instructions for carrying out the above-mentioned functionality may be stored on the context assistance system server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of devices, or communication of devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein, including, for example, a user profile associated with content item consumption, user preferences for receiving reminders about subjects in a content item, contextual information about a content item, and weights associated with associations between subjects. Nonvolatile memory may also be used (e.g., to launch a boot-up routine and other instructions). Cloud-based storage, described in relation to FIG. 5, may be used to supplement storage 408 or instead of storage 408. In some embodiments, a database is accessible at the cloud-based storage, where the database stores a user profile associated with content item consumption, user preferences for receiving reminders about subjects in a content item, contextual information about a content item, and weights associated with associations between subjects. Nonvolatile memory may also be used (e.g., to launch a boot-up routine and other instructions).

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content items into the preferred output format of the user equipment 400. Circuitry 404 may also include digital-to-analog converter circuitry and analog-to-digital converter circuitry for converting between digital and analog signals. The tuning and encoding circuitry may be used by the device to receive and to display, to play, or to record content items. The tuning and encoding circuitry may also be used to receive content item data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, or multiple-tuner recording). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of device 400 and user equipment system 401. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content item may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of each one of device 400 and user equipment system 401 or may be stand-alone units. The audio component of videos and other content items displayed on display 412 may be played through speakers 414. In some embodiments, the audio may be distributed to a receiver (not shown), which processes and outputs the audio via speakers 414.

The context assistance system may be implemented using any suitable architecture. For example, it may be a stand-alone application wholly-implemented on each one of device 400 and user equipment system 401. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410.

In some embodiments, the application is a client-server based application. Data for use by a thick or thin client implemented on each one of device 400 and user equipment system 401 is retrieved on-demand by issuing requests to a server remote to each one of device 400 and user equipment system 401. In one example of a client-server based context assistance system, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400.

In some embodiments, the context assistance system is downloaded and interpreted or otherwise run by an interpreter or virtual machine (run by control circuitry 404). In some embodiments, the context assistance system may be encoded in the ETV Binary Interchange Format (EBIF), received by control circuitry 404 as part of a suitable feed, and interpreted by a user agent running on control circuitry 404. For example, the context assistance system may be an EBIF application. In some embodiments, the context assistance system may be defined by a series of JAVA-based files that are received and run by a local virtual machine or other suitable middleware executed by control circuitry 404. In some of such embodiments (e.g., those employing MPEG-2 or other digital media encoding schemes), the context assistance system may be, for example, encoded and transmitted in an MPEG-2 object carousel with the MPEG audio and video packets of a program.

Figure 5:
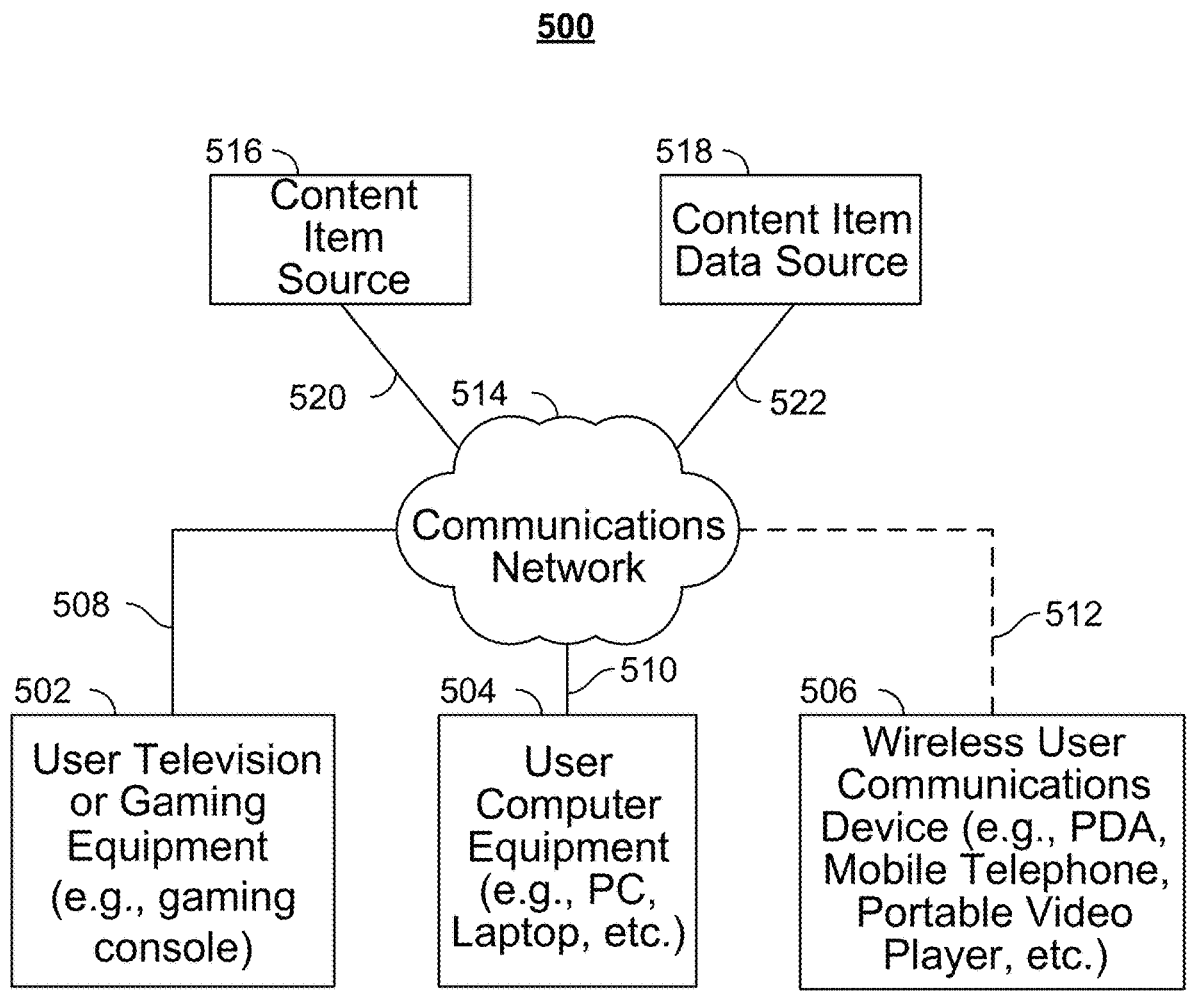
FIG. 5 shows a block diagram of an illustrative context assistance system, in accordance with some embodiments of the disclosure.

Each one of device 102, 202, 400 and user equipment system 401 of FIG. 4 may be implemented in system 500 of FIG. 5 as user television or gaming equipment 502, user computer equipment 504, wireless user communications device 506, or any other type of user equipment suitable for accessing content items, such as a non-portable gaming machine. For simplicity, these devices may be referred to herein collectively as user equipment or devices and may be substantially similar to devices described above. Devices, on which an application may be implemented, may function as a standalone device or may be part of a network of devices. Various network configurations of devices may be implemented and are discussed in more detail below.

A device utilizing at least some of the system features described above in connection with FIG. 4 may not be classified solely as user television or gaming equipment 502, user computer equipment 504, or a wireless user communications device 506. For example, user television or gaming equipment 502 may, like some user computer equipment 504, be Internet-enabled allowing for access to Internet content, while user computer equipment 504 may, like some television equipment 502, include a tuner allowing for access to television programming. The application may have the same layout on various different types of user equipment or may be tailored to the display capabilities of the user equipment. For example, on user computer equipment 504, the context assistance system may be provided as a web site accessed by a web browser. In another example, the context assistance system may be scaled down for wireless user communications devices 506.

In system 500, there is typically more than one of each type of device but only one of each is shown in FIG. 5 to avoid overcomplicating the drawing. In addition, each user may utilize more than one type of device and also more than one of each type of device.

In some embodiments, a device (e.g., user television or gaming equipment 502, user computer equipment 504, wireless user communications device 506) may be referred to as a "second device." For example, a second device may provide an interface for adjusting settings and display preferences of the first device. In some embodiments, the second device is configured for interacting with other second devices or for interacting with a social network. The second screen device may be located in the same room as the first device, a different room from the first device but in the same house or building, or in a different building from the first device.

The user may also set various settings to maintain consistent application settings across in-home devices and remote devices. For example, if a user changes his or her preference for how a context assistance system displays the reminder on a publicly accessible personal computer in a library, this feature would also be enabled on the user's in-home devices (e.g., user television or gaming equipment and user computer equipment) as well as the user's mobile devices, if desired. Therefore, changes made on one device may change the content item consumption experienced on another device, regardless of whether they are the same or a different type of device. In addition, the changes made may be based on settings input by a user, as well as user activity monitored by the context assistance system. In addition, two devices may work together to provide functionality for the user. For example, the first device changing the user preference for what contextual information is displayed in a reminder may further instruct the second device to perform a similar change if the second device is also associated with the user profile containing the user preference.

The devices may be coupled to communications network 514. Namely, user television or gaming equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the devices may be provided by one or more of these communications paths but are shown as a single path in FIG. 5 to avoid overcomplicating the drawing.

Although communications paths are not drawn between devices, these devices may communicate directly with each other via communications paths, such as those described above in connection with paths 508, 510, and 512, as well as other short-range point-to-point communications paths, such as USB cables, IEEE 1394 cables, wireless paths (e.g., Bluetooth, infrared, or IEEE 502-11x), or other short-range communication via wired or wireless paths. BLUETOOTH is a certification mark owned by Bluetooth SIG, INC. The devices may also communicate with each other directly through an indirect path via communications network 514.

System 500 includes content item source 516 and content item data source 518 coupled to communications network 514 via communications paths 520 and 522, respectively. Paths 520 and 522 may include any of the communications paths described above in connection with paths 508, 510, and 512. Communications with the content item source 516 and content item data source 518 may be exchanged over one or more communications paths but are shown as a single path in FIG. 5 to avoid overcomplicating the drawing. In addition, there may be more than one of each of content item source 516 and content item data source 518, but only one of each is shown in FIG. 5 to avoid overcomplicating the drawing. If desired, content item source 516 and content item data source 518 may be integrated as one source device. Although communications between sources 516 and 518 with devices 502, 504, and 506 are shown as through communications network 514, in some embodiments, sources 516 and 518 may communicate directly with devices 502, 504, and 506 via communications paths (not shown) such as those described above in connection with paths 508, 510, and 512.

Content item source 516 may include one or more types of content item distribution equipment including a television distribution facility, cable system headend, satellite distribution facility, programming sources (e.g., television broadcasters), intermediate distribution facilities and/or servers, Internet providers, on-demand content item servers, and other content item providers. Content item source 516 may be the originator of content items (e.g., a television broadcaster or a Webcast provider) or may not be the originator of content items (e.g., an on-demand content item provider or an Internet provider of content items of broadcast programs for downloading). Content item source 516 may include cable sources, satellite providers, on-demand providers, Internet providers, over-the-top content item providers, or other providers of content items. Content item source 516 may also include a remote content item server used to store different types of content (including video content items selected by a user), in a location remote from any of the devices. Content item source 516 may include at least 2 sources for content items that provide content items for the context assistance system to provide on the devices (e.g., devices 102 and 202). Systems and methods for remote storage of content items and providing remotely stored content items to user equipment are discussed in greater detail in connection with Ellis et al., U.S. Pat. No. 7,761,892, issued Jul. 20, 2010, which is hereby incorporated by reference herein in its entirety.

Content item data source 518 may provide data related to the content items. Content item data may be provided to the devices using any suitable approach. In some embodiments, the context assistance system may be a stand-alone interactive television program guide that receives program guide data via a data feed (e.g., a continuous feed or trickle feed). Program schedule data and other content item data may be provided to the user equipment on a television channel sideband, using an in-band digital signal, using an out-of-band digital signal, or by any other suitable data transmission technique. Program schedule data and other content item data may be provided to user equipment on multiple analog or digital television channels.

In some embodiments, content item data from content item data source 518 may be provided to user's equipment using a client-server approach. For example, a user equipment device may pull content item data from a server, or a server may push content item data to a user equipment device. In some embodiments, a context assistance system client residing on the user's equipment may initiate sessions with source 518 to obtain content item data when needed, e.g., when the content item data is out of date or when the device requests the data. Content item data may be provided to the user equipment with any suitable frequency (e.g., continuously, daily, a user-specified period of time, a system-specified period of time, or in response to a request from user equipment). Content item data source 518 may provide devices 502, 504, and 506 the application itself or software updates for the application.

In some embodiments, the content item data may include viewer data. For example, the viewer data may include current and/or historical user activity information (e.g., what content items the user typically watches, what times of day the user watches content items, whether the user interacts with a social network, at what times the user interacts with a social network to post information, what types of content items the user typically watches (e.g., pay TV or free TV), mood, or brain activity information). The content item data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of less or more than one year. The content item data may include a model (e.g., a survivor model) used for generating a score that indicates a likelihood a given user will terminate access to a service/source. For example, the application may monitor a user's engagement with content items to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access. The content item data may include metadata files pertaining to the content item or content item segments (e.g., characteristics of content item portions, content item segments related to a current portion of a content item based on a characteristic). The content item data may also include user profiles used to determine likelihoods of the user navigating away from or to a content item portion or segment. For example, content item data may include information characterizing content item such as the director, producer, actors, activities occurring during the content item, locations the content item was created, any description of the content item context or the content item production, or any suitable combination thereof.

Applications may be, for example, stand-alone applications implemented on devices. For example, the application may be implemented as software or a set of executable instructions which may be stored in storage 408 and executed by control circuitry 404 of each one of device 400 and user equipment system 401. In some embodiments, applications may be client-server applications where only a client application resides on the device, and server application resides on a remote server. For example, applications may be implemented partially as a client application on control circuitry 404 of each one of device 400 and user equipment system 401 and partially on a remote server as a server application (e.g., content item data source 518) running on control circuitry of the remote server. When executed by control circuitry of the remote server (such as content item data source 518), the application may instruct the control circuitry to generate the content item displays and transmit the generated displays to the devices. The server application may instruct the control circuitry of the content item data source 518 to transmit data for storage on the device. The client application may instruct control circuitry of the receiving user equipment to generate the content item displays.

Content and/or content item data delivered to devices 502, 504, and 506 may be OTT content or streaming content items. OTT content item delivery allows Internet-enabled devices, including any device described above, to receive content that is transferred over the Internet, including any content described above, in addition to content received over cable or satellite connections. OTT content is delivered via an Internet connection provided by an Internet service provider (ISP), but a third party distributes the content items. The ISP may not be responsible for the viewing abilities, copyrights, or redistribution of the content, and may only transfer IP packets provided by the OTT content item provider. Examples of OTT content item providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content item providers may additionally or alternatively provide content item data described above.

Content item output system 500 is intended to illustrate a number of approaches, or network configurations, by which devices and sources of content and content item data may communicate with each other for the purpose of synchronizing metadata generated that is associated with a user profile and displaying similar reminders based on the synchronized metadata. The embodiments described herein may be applied in any one or a subset of these approaches, or in a system employing other approaches for delivering content items. The following four approaches provide specific illustrations of the generalized example of FIG. 5.

In one approach, devices may communicate with each other within a home network. Devices may communicate with each other directly via short-range point-to-point communication schemes described above, via indirect paths through a hub or other similar device provided on a home network, or via communications network 514. Each of the multiple individuals in a single home may operate different devices on the home network. As a result, it may be desirable for various context assistance system information or settings to be communicated between the different devices. For example, it may be desirable for users to maintain consistent application settings on different devices within a home network, as described in greater detail in Ellis et al., U.S. Patent Publication No. 2005/0251827, filed Jul. 11, 2005. Different types of devices in a home network may also communicate with each other to transmit content items. For example, a user may use content navigation button 120 on one device while the content is transmitted to a second device to be generated for display.

In a second approach, users may have multiple types of user equipment by which they access content items. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., recordings, reminders, content item segment buffering enablement, or other settings) on the online context assistance system to control the user's in-home equipment. The online application may control the user's equipment directly, or by communicating with an application on the user's in-home equipment. Various systems and methods for devices communicating, where the devices are in locations remote from each other, is discussed in, for example, Ellis et al., U.S. Pat. No. 8,046,801, issued Oct. 25, 2011, which is hereby incorporated by reference herein in its entirety.

In a third approach, users of devices inside and outside a home may use their application to communicate directly with content item source 516 to access content items. Specifically, within a home, users of user television or gaming equipment 502 and user computer equipment 504 may access the application to navigate among and locate desirable content items. Users may also access the application outside of the home using wireless user communications devices 506 to navigate among and locate desirable content items.

In a fourth approach, devices may operate in a cloud computing environment to access cloud services. In a cloud computing environment, various types of computing services for content item sharing, storage or distribution (e.g., video sharing sites or social networking sites) are provided by a collection of network-accessible computing and storage resources, referred to as "the cloud." For example, the cloud may include a collection of server computing devices, which may be located centrally or at distributed locations, that provide cloud-based services to various types of users and devices connected via a network such as the Internet via communications network 514. These cloud resources may include one or more content item sources 516 and one or more content item data sources 518. In addition or in the alternative, the remote computing sites may include other devices, such as user television or gaming equipment 502, user computer equipment 504, and wireless user communications device 506. For example, the other devices may provide access to a stored copy of a video or a streamed video. In such embodiments, devices may operate in a peer-to-peer manner without communicating with a central server.

The cloud provides access to services, such as content item storage, content item sharing, or social networking services, among other examples, as well as access to any content items described above, for devices. Services may be provided in the cloud through cloud computing service providers, or through other providers of online services. For example, the cloud-based services may include a content item storage service, a content item sharing site, a social networking site, or other services via which a user-sourced content item is distributed for viewing by others on connected devices. These cloud-based services may allow a device to store content items to the cloud and to receive content items from the cloud rather than storing content items locally and accessing locally-stored content items.

Cloud resources may be accessed by a device using, for example, a web browser, an application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a device may receive content items from multiple cloud resources simultaneously. For example, a device may stream audio from one cloud resource while downloading content items from a second cloud resource. Or a device may download content items from multiple cloud resources for more efficient downloading. In some embodiments, devices may use cloud resources for processing operations such as the processing operations performed by processing circuitry described in relation to FIG. 4.

Any one or more of device 400 and user equipment system 401 of FIG. 4 and user television or gaming equipment 502, user computer equipment 504, and wireless user communications device 506 of FIG. 5 may be used to provide a thorough and efficient content item consumption experience. For example, the context assistance systems, associated with devices, of the present disclosure may cause to be provided contextual information for reminding a content item consumer of associations among subjects previously referenced in a content item. Further details of the present disclosure are discussed below in connection with the flowcharts of FIGS. 6-9.

Figure 6:
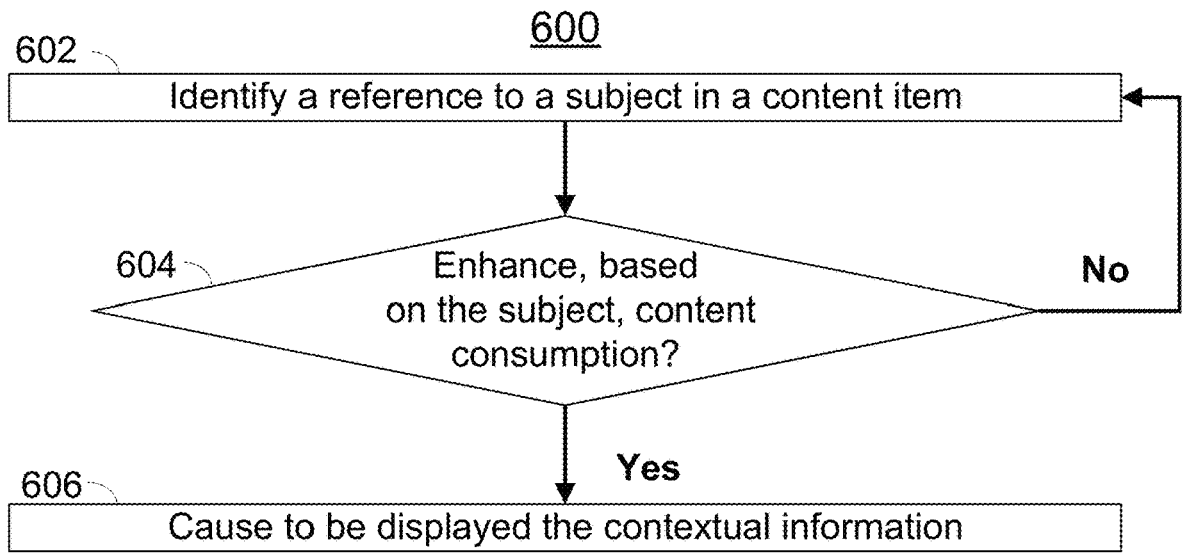
FIG. 6 depicts an illustrative flowchart of process 600 for causing to be displayed contextual information based on a time a subject was last referenced, in accordance with some embodiments of the disclosure.

FIG. 6 depicts an illustrative flowchart of process 600 for causing to be displayed contextual information based on a time a subject was last referenced, in accordance with some embodiments of the disclosure. It should be noted that process 600 may be performed by control circuitry 404 of FIG. 4. Control circuitry 404 may be part of a device having a display 412 (e.g., a device that may have any or all of the functionality of user television or gaming equipment 502, user computer equipment 504, and/or wireless communications device 506 of FIG. 5), part of a remote server separated from the user equipment by way of a communication network (e.g., communication network 514 of FIG. 5), or may be distributed over a combination of both.

At step 602, the context assistance system identifies a reference to a subject in a content item. In some embodiments, the context assistance system applies, to the content item, image processing, audio processing, video processing, or a combination thereof. For example, the context assistance system may apply image processing to content item instantiation 110 to determine that content item dialogue 114 contains references to subjects "Recipe" and "Gotter." The context assistance system may apply audio processing to a podcast to identify spoken references to subjects. In some embodiments, the context assistance system receives information from a content item provider to identify a reference to a subject in the content item provider's content item. For example, the context assistance system analyzes closed captioning provided by HBO when identifying that a reference to the subject "Joffrey" was made in a scene of S7E3.

At step 604, the context assistance system determines whether to enhance, based on the subject referenced in step 602, the content consumption. In some embodiments, the context assistance system determines when the subject was last referenced to determine whether to enhance the content consumption. In some embodiments, the context assistance system uses generated metadata to determine when a subject was last referenced. For example, a context assistance system uses metadata 230 to determine that, at consumption time 208, the subject "Princess Zelda" was last referenced Dec. 26, 2018. The context assistance system may determine, from a sequential ordering of content items, when a subject was last referenced. For example, the last time before S7E3 of "Game of Thrones" that the subject "Joffrey" was referenced may be at S4E2, which is 31 episodes away from S7E3 or at least 31 hours away from S7E3. The context assistance system may determine when the subject was last referenced according to a count of intervening subjects referenced. For example, the context assistance system determines that 250 subjects (e.g., characters, items, events, and locations) have been referenced between the current and previous time Joffrey was referenced.

The context assistance system may further determine whether to enhance content consumption based on a referenced subject by determining whether to provide contextual information about the subject. The context assistance system may calculate a subject clarification value based on an episode difference and a time difference between references to a subject in a content item. For example, if the calculated subject clarification value is greater than a predetermined threshold, the context assistance system determines to provide contextual information about the subject. A subject clarification value reflecting 2,945 hours associated with the last time "Joffrey" was referenced is greater than a predetermined threshold of 168 hours. In turn, the context assistance system may determine to provide contextual information about Joffrey. The context assistance system may apply criteria to determine whether to provide contextual information about a subject. Criterion for determining whether to provide contextual information about a subject previously referenced may include time, context, a user profile, or any suitable combination thereof. For example, a context assistance system determines that, because the context surrounding a scene of "Game of Thrones" where character Jaime Lannister is imprisoned is the same as a previous scene where Jaime is escaping a castle, the contextual information that "Jaime is escaping to save Cersei" should be provided. If the context assistance system determines to provide contextual information about the subject, the context assistance system proceeds to step 606 to cause to be displayed the contextual information. Otherwise, the context assistance system returns to step 602 to identify a different reference.

At step 606, the context assistance system causes to be displayed the contextual information. In some embodiments, the contextual information is caused to be displayed on the same screen the content item is displayed on. For example, contextual information 116 is provided on the same screen as the video game being displayed on device 102. In some embodiments, the contextual information is caused to be displayed in the closed captions. For example, contextual information "Jaime is escaping to save Cersei" is provided in closed captioning "Why do you always go back to her? (Jaime is escaping to save Cersei)" through parentheticals. In some embodiments, contextual information is caused to be displayed in response to a user prompt (e.g., mouse click or mouse hover-over). For example, in a video game, a user's touch of a recipe on the screen of a touchscreen device commands the context assistance system to cause to be displayed contextual information about the recipe (e.g., "Gotter's grandfather once worked as a chef at Hyrule Castle").

Figure 7:
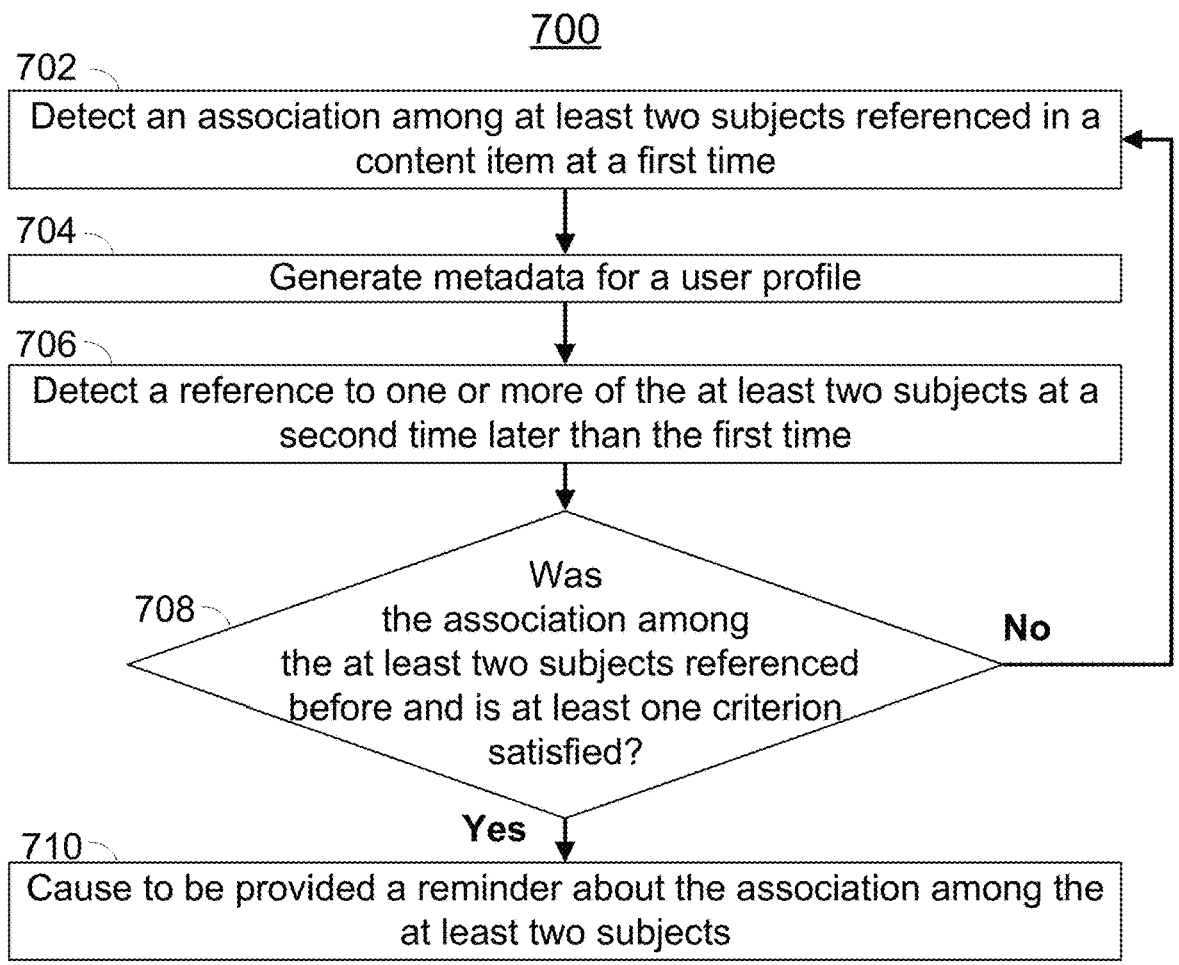
FIG. 7 depicts an illustrative flowchart of process 700 for causing to be displayed contextual information based on an association among subjects being previously referenced, in accordance with some embodiments of the disclosure.

FIG. 7 depicts an illustrative flowchart of process 700 for causing to be displayed contextual information based on an association among subjects being previously referenced, in accordance with some embodiments of the disclosure. A context assistance system may monitor content item consumption to determine that a reminder having contextual information about reoccurring associations should be provided. It should be noted that process 700 may be performed by control circuitry 404 of FIG. 4.

At step 702, the context assistance system detects an association among at least two subjects referenced in a content item at a first time. This detection may be similar to that of step 602 in process 600. In some embodiments, the context assistance system applies, to the content item, image processing, audio processing, video processing, or a combination thereof. For example, the context assistance system applies both image and audio processing to a scene of "Game of Thrones" to determine that the character Jaime Lannister said "Joffrey," and accordingly, the context assistance system detects an association between "Jaime Lannister" and "Joffrey."

At step 704, the context assistance system generates metadata for a user profile that is associated with the consumption of the content item. Metadata may contain information about the association among the at least two subjects. This information includes time the association was last consumed, the subjects involved in the association, contextual information surrounding the association (e.g., storyline), any suitable information that is shared among the subjects involved in the association, or any combination thereof. Metadata may be organized into data structures to be maintained in association with a user profile as exemplified in FIGS. 2-3.

At step 706, the context assistance system detects a reference to one or more of the at least two subjects at a second time later than the first time. This detection may be performed in a manner such as any of those described in step 702.

At step 708, the context assistance system determines whether the association among the at least two subjects was referenced before and if at least one criterion is satisfied. The determination of whether the association was referenced before may be performed using any of the methods described in the description of history analysis engine 332 in FIG. 3. In some embodiments, the context assistance system uses metadata containing information about the last reference made to an association (e.g., Gotter was last referenced at consumption time 108). If the context assistance system determines that the association among the at least two subjects was referenced before, the context assistance system proceeds to step 710 to cause to be provided the reminder about the association. Otherwise, the context assistance system returns to step 702 to detect another association. In some embodiments, criteria applied by the context assistance system are based on time differences between the last two times the association was referenced. For example, the context assistance system in operation with device 102 applies the time difference between January 16 and May 28 to determine that the time difference meets a criterion that reminders should be displayed when associations have not been referenced for over one month. In some embodiments, criteria applied by the context assistance system are based on a purchase history related to the association. For example, an in-game purchase of a "fruitcake potion" is a criterion that the context assistance system uses to determine to provide a reminder during content item instantiation 110 to the user that an upcoming purchase of fruitcake potion will be necessary. In step 706, the context assistance system may detect a reference to "fruitcake" as shown in content item dialogue 114. In step 708, the context assistance system determines that there was a previously referenced association between subjects "fruitcake" and the contents of the user's gaming inventory generated when the user last purchased fruitcake potion.

At step 710, the context assistance system causes to be provided the reminder about the association among the at least two subjects using at least one criterion. Any of the methods described in step 606 or the description of FIGS. 1A-1D may be used for causing to be displayed the contextual information. Such methods may include causing to be displayed a pop-up with contextual information, displaying the contextual information in-line with closed captioning, displaying contextual information in response to a user prompt, or any suitable combination thereof.

Figure 8:
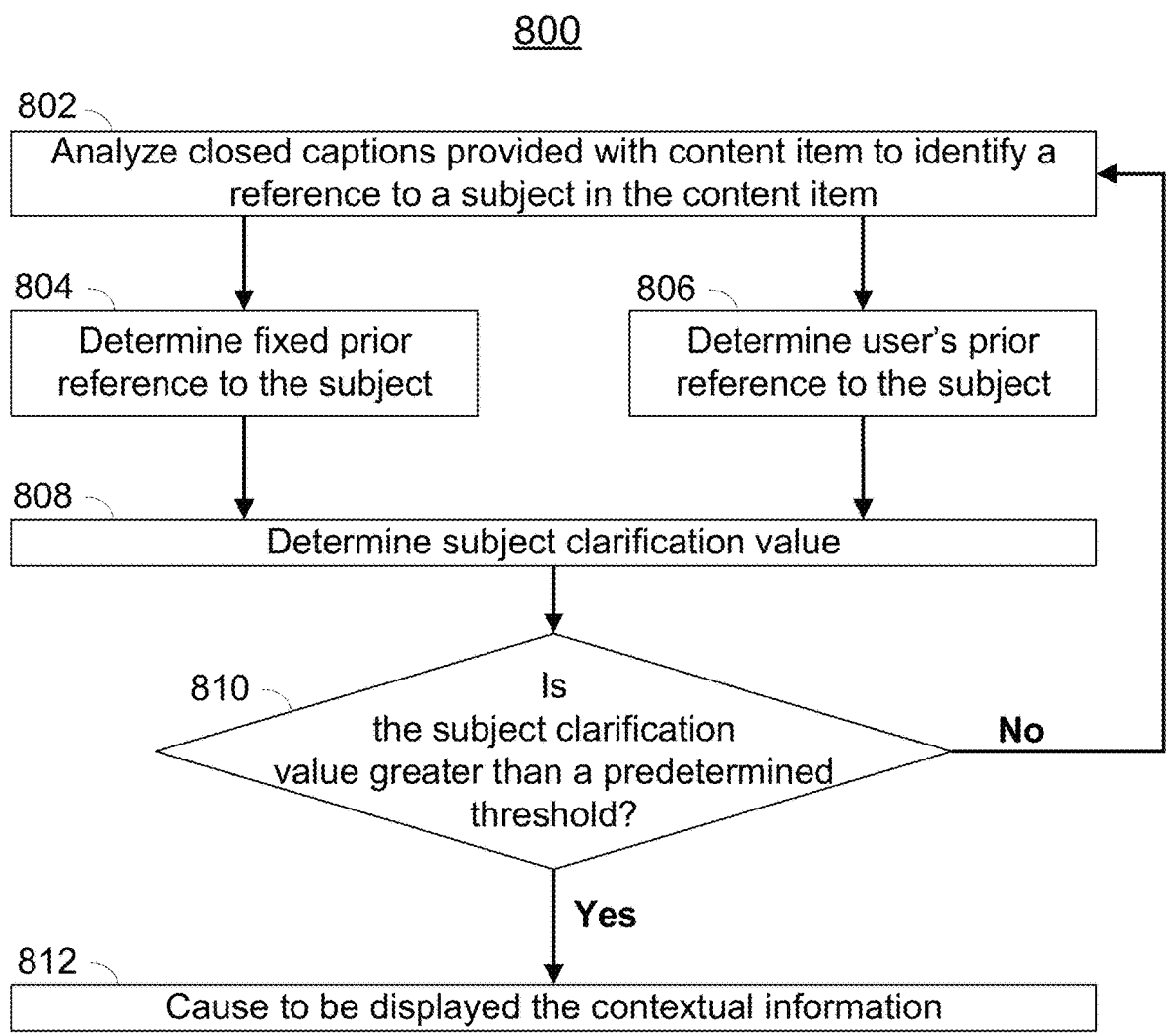
FIG. 8 depicts an illustrative flowchart of process 800 for causing to be displayed contextual information based on a subject clarification value, in accordance with some embodiments of the disclosure.

FIG. 8 depicts an illustrative flowchart of process 800 for causing to be displayed contextual information based on a subject clarification value, in accordance with some embodiments of the disclosure. It should be noted that process 800 may be performed by control circuitry 404 of FIG. 4. Process 800 exemplifies steps that a context assistance system may take, using closed captions, to maintain information about associations among referenced subjects and cause to be displayed contextual information regarding the associations.

At step 802, the context assistance system analyzes closed captions provided with a content item to identify a reference to a subject in the content item. In some embodiments, closed captions are provided by a content item provider and analyzed by the context assistance system. For example, a context assistance system identifies nouns in closed captions, provided by HBO or an intermediary video provider that has distributed episodes of "Game of Thrones" (e.g., Hulu), associated with each scene of an episode of "Game of Thrones." In a closed caption "That was Joffrey's sword, wasn't it?," the context assistance system may identify "Joffrey," "sword," "Joffrey's sword," or any combination thereof as nouns in the closed caption.

At step 804, the context assistance system determines the fixed prior reference to the subject. In some embodiments, a fixed prior reference is a fixed quantity or time because a content item provider has determined this non-changing value. For example, the order of episodes in a season of "Game of Thrones" is fixed by HBO. Accordingly, a fixed prior reference to "Joffrey" of 31 episodes may be determined based on last episode referencing Joffrey prior to a current episode in which Joffrey appears. Similarly, a video game franchise such as "The Legend of Zelda" has subjects associated with more than one game and a fixed prior reference could be the last game in which a character was referenced. For example, Princess Zelda is referenced very frequently across all games of "The Legend of Zelda." The character Navi may have a larger fixed prior reference in the year 2019 than Princess Zelda has because Navi was last referenced in "The Legend of Zelda": Majora's Mask, released in 2000.

At step 806, the context assistance system determines a user's prior reference to the subject. In some embodiments, a context assistance system includes a date of consumption when generating metadata for detected associations among subjects in a content item. For example, a context assistance system generating metadata for content item instantiation 100 may include "January 16" in the metadata. At content item instantiation 110, the context assistance system references the generated metadata to determine that the last time Gotter's recipe was referenced to the user was January 16.

At step 808, the context assistance system determines a subject clarification value. As described in the description of FIG. 3, a subject clarification value may be calculated based on a combination of episode difference and time difference between association references. The context assistance system may calculate the absolute difference between values obtained from steps 804 and 806 corresponding, respectively, to the time durations since the previous reference in an episode and the previous reference to the user.

At step 810, the context assistance system determines whether the subject clarification value is greater than a predetermined threshold. As described in the description of FIG. 3, a predetermined threshold can be used to compare with the determined subject clarification value. In some embodiments, the threshold is dynamic and adjustable based upon factors such as user feedback. For example, a threshold may initially default to a week or 168 hours, but the user may directly or indirectly change this by manually changing the threshold (e.g., a setting in a user profile) or through the actions taken while consuming content items. Indirect changes to the threshold may arise from user selections of feedback icons that are caused to be displayed with the contextual information. The context assistance system may determine, based on the high frequency at which the user disapproves of the contextual information provided, that the threshold time duration is too short. Accordingly, the context assistance system may increase the threshold by a predetermined percentage of the current threshold (e.g., 100% or doubling the threshold value) or based on an average duration that a user consumes content items in one sitting (e.g., the user averages content item consumption times of approximately 2 weeks, and the threshold may be changed from 1 week to 3 weeks). If the context assistance system determines that the subject clarification value is greater than the predetermined threshold, the context assistance system proceeds to step 812 to cause to be displayed the contextual information. Otherwise, the context assistance system returns to step 802 to identify another reference through closed caption analysis.

At step 812, the context assistance system causes to be displayed the contextual information. Any of the methods described in step 606 or the description of FIGS. 1A-1D may be used for causing to be displayed the contextual information. Such methods may include causing to be displayed a pop-up with contextual information, displaying the contextual information in-line with closed captioning, displaying contextual information in response to a user prompt, or any suitable combination thereof.

Figure 9:
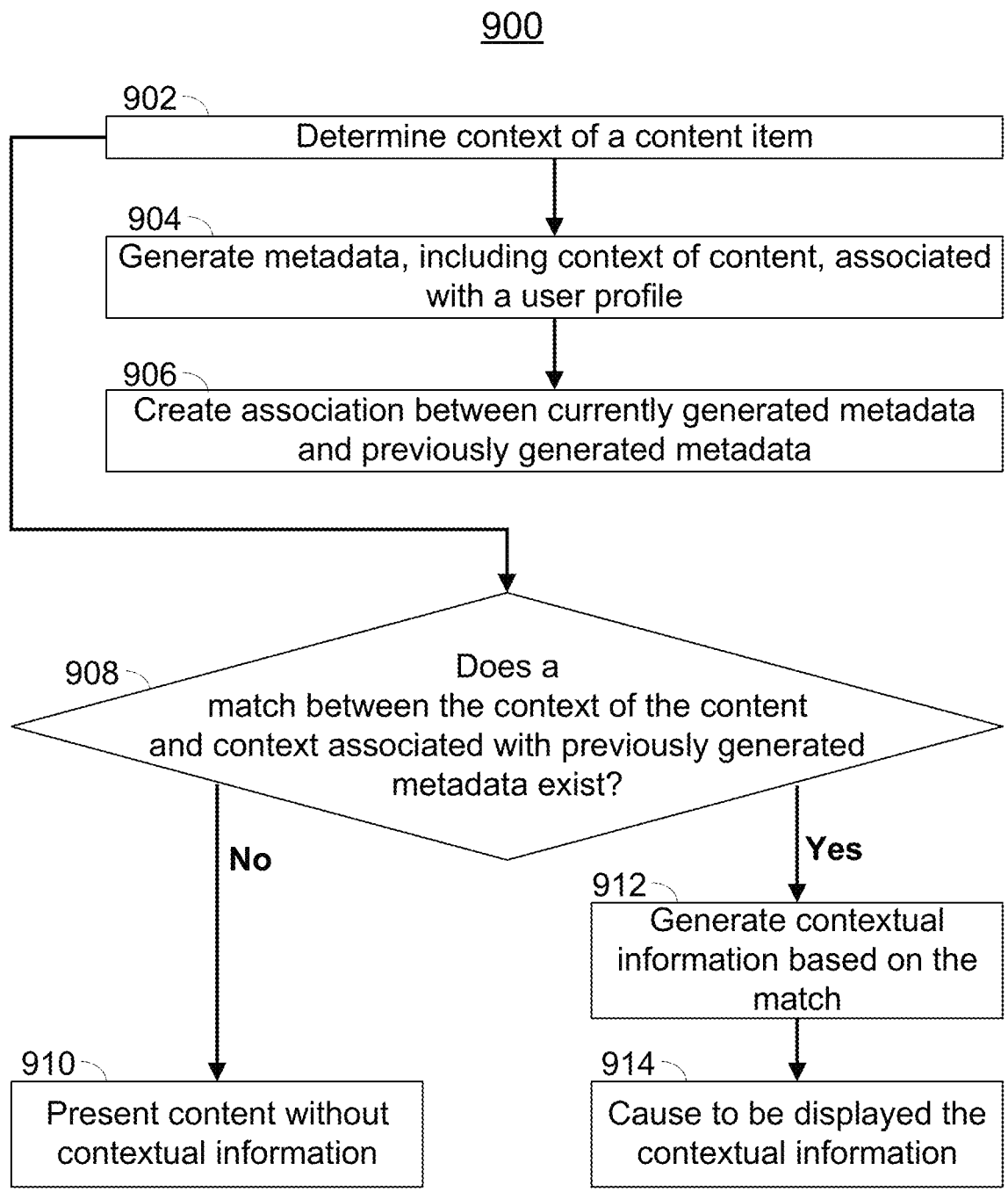
FIG. 9 depicts an illustrative flowchart of process 900 for causing to be displayed contextual information based on a context criterion, in accordance with some embodiments of the disclosure.

FIG. 9 depicts an illustrative flowchart of process 900 for causing to be displayed contextual information based on a context criterion, in accordance with some embodiments of the disclosure. It should be noted that process 900 may be performed by control circuitry 404 of FIG. 4. Process 900 exemplifies steps that a context assistance system may take, using a criterion of matching contexts, to maintain information about associations among referenced subjects and cause to be displayed contextual information regarding the associations.

At step 902, the context assistance system determines the context of the content item. In some embodiments, the context assistance system accesses background information, as provided by a content item provider or a third-party data repository (e.g., IMDb's forums), about an episode of a content item series in the form of a summary recapturing what has happened in earlier episodes, screenplays of each episode in the series, any suitable metadata that describes the context of each scene, or any combination thereof. The context assistance system may, from the provided information, determine context relevant to a content item that is being presented for consumption. For example, the context assistance system parses an HBO-provided "Game of Thrones" summary to determine the storyline context of a scene in an episode of "Game of Thrones." The context assistance system may determine context from background information compiled over third-party forums and publicly maintained encyclopedias. For example, the context assistance system accesses a gaming forum with forum members discussing Gotter's quest in "The Legend of Zelda" to determine the context of content item instantiation 110 by analyzing text of forum posts that have been tagged with the quest in discussion. From this analysis, the context assistance system may determine that the context is that Gotter's family once served the Royal Family of Hyrule.

At step 904, the context assistance system generates metadata, associated with a user profile, that includes the determined context. After determining the context in step 902, the context assistance system may include that context in generated metadata that is associated with a user profile. For example, metadata generated after determining the context that Gotter's family once served the Royal Family of Hyrule contains this context, links to consumption time, and links to subjects "Gotter," "Gotter's recipe," and "Royal Family of Hyrule."

At step 906, the context assistance system creates an association between currently generated metadata and previously generated metadata. The links or associations among subjects of step 904 may be generated in metadata that is associated with a user profile, as described in the description of FIG. 2. The generated metadata may contain associations that are further connected to previously generated metadata. For example, at content item instantiation 100, the context assistance system generates a link between characters Link and Gotter due to their interaction to initiate Gotter's quest for a recipe. At content item instantiation 110, the context assistance system creates an association between Link, Gotter, and Gotter's recipe containing information that the quest was completed at consumption time 118 because the user had found Gotter's recipe.

At step 908, the context assistance system determines whether a match between the context of the content item and the context associated with previously generated metadata exists. In some embodiments, metadata such as metadata 230 is structured such that the context assistance system uses a subject to query a data structure for contextual information (e.g., context) related to the subject. For example, character-specific metadata 235 is accessed by using "Gotter" in character list 231 to look up corresponding "Grandfather worked as a chef at Hyrule Castle" in content item information 232. In some embodiments, a consumption indicator (e.g., a binary flag such as "1" and "0") maintained in metadata indicates whether a match between context of a content item at a current time and a previous time exists. If the context assistance system determines that a match between the context of the content item and the context associated with previously generated metadata exists, the context assistance system proceeds to step 912 to generate contextual information based on the match. Otherwise, the context assistance system proceeds to step 910 to present the content item without contextual information.

At step 910, the context assistance system presents content items without contextual information. Although not depicted, the context assistance system may resume process 900 after step 910 to continue determining if contextual information should be provided for future determinations of context of the content item.

At step 912, the context assistance system generates contextual information based on the match found in step 908. In some embodiments, the context assistance system generates contextual information using metadata associated with the user profile. For example, contextual information 116 may be generated using metadata 230 after determining that the context of both content item instantiations 100 and 110 involve Gotter's history with the Royal Family of Hyrule and content item information 232 for character-specific metadata 235 is relevant to this context.

At step 914, the context assistance system causes to be displayed the contextual information. Any of the methods described in step 606 or the description of FIGS. 1A-1D may be used for causing to be displayed the contextual information. Such methods may include causing to be displayed a pop-up with contextual information, displaying the contextual information in-line with closed captioning, displaying contextual information in response to a user prompt, or any suitable combination thereof.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A computer-implemented method comprising:
   identifying, using control circuitry, a reference to a subject in a first episode of a series, wherein the first episode is a part of the series of sequentially ordered episodes;
   identifying, using the control circuitry, a second episode in the series of sequentially ordered episodes that references the subject, wherein the subject was last referenced in the second episode prior to the first episode;
   calculating a count of episodes in the series of sequentially ordered episodes that are between the first episode and the second episode;
   determining, using the control circuitry, based on the count of episodes in the series of sequentially ordered episodes that are between the first episode and the second episode, whether to provide contextual information about the subject; and
   in response to determining to provide the contextual information, causing to be displayed the contextual information.

2. The method of claim 1, wherein identifying, using control circuitry, the reference to the subject in the first episode comprises:
   analyzing closed-captioning of the first episode; and
   identifying a proper noun referencing the subject within the closed captions of the first episode.

3. The method of claim 1, wherein determining based on the count of the episodes in the series of sequentially ordered episodes that are between the first episode and the second episode, whether to provide contextual information about the subject comprises determining an elapsed time between the current time and a last time the subject was referenced.

4. The method of claim 1, wherein determining whether to provide contextual information about the subject comprises:
   calculating, based on the count of the episodes in the series of sequentially ordered episodes that are between the first episode and the second episode, a subject clarification score; and
   determining that the subject clarification score is greater than a dynamic threshold, wherein the dynamic threshold is based on a user preference.

5. The method of claim 1, wherein causing to be displayed the contextual information comprises causing to be displayed the contextual information within closed captions of the first episode.

6. A system comprising:
control circuitry configured to:
identify a reference to a subject in a first episode, wherein the first episode is a part of a series of sequentially ordered episodes;
identify a second episode in the series of sequentially ordered episodes that references the subject, wherein the subject was last referenced in the second episode prior to the first episode;
calculate a count of episodes in the series of sequentially ordered episodes that are between the first episode and the second episode;
determine based on the count of episodes in the series of sequentially ordered episodes that are between the first episode and the second episode, whether to provide contextual information about the subject; and
in response to determining to provide the contextual information, cause to be displayed the contextual information.

7. The system of claim 6, wherein the control circuitry, when identifying the reference to the subject in the first episode, is further configured to:
analyze closed-captioning of the first episode; and
identify a proper noun referencing the subject within the closed captions of the first episode.

8. The system of claim 6, wherein the control circuitry is configured to determine based on the count of episodes in the series of sequentially ordered episodes that are between the first episode and the second episode, whether to provide contextual information about the subject comprises by determining an elapsed time between the current time and a last time the subject was referenced.

9. The system of claim 6, wherein the control circuitry, when determining whether to provide contextual information about the subject, is further configured to:
calculate based on the count of episodes in the series of sequentially ordered episodes that are between the first episode and the second episode, a subject clarification score; and
determine that the subject clarification score is greater than a dynamic threshold, wherein the dynamic threshold is based on a user preference.

10. The system of claim 6, wherein the control circuitry is configured to cause to be displayed the contextual information by causing to be displayed the contextual information within closed captions of the first episode.

11. A non-transitory computer-readable medium having instructions encoded thereon that when executed by control circuitry causes the control circuitry to:
identify a reference to a subject in a first episode, wherein the first episode is a part of a series of sequentially ordered episodes;
identify a second episode in the series of sequentially ordered episodes that references the subject, wherein the subject was last referenced in the second episode prior to the first episode;
calculate a count of episodes in the series of sequentially ordered episodes that are between the first episode and the second episode;
determine based on the count of episodes in the series of sequentially ordered episodes that are between the first episode and the second episode, whether to provide contextual information about the subject; and
in response to determining to provide the contextual information, cause to be displayed the contextual information.

12. The non-transitory computer-readable medium of claim 11, further comprising instructions that when executed by the control circuitry cause the control circuitry to identify the reference to the subject in the first episode by:
analyzing closed-captioning of the first episode; and
identifying a proper noun referencing the subject within the closed captions of the first episode.

13. The non-transitory computer-readable medium of claim 11, further comprising instructions that when executed by the control circuitry cause the control circuitry to determine based on the count of episodes in the series of sequentially ordered episodes that are between the first episode and the second episode, whether to provide contextual information about the subject by determining an elapsed time between the current time and a last time the subject was referenced.

14. The non-transitory computer-readable medium of claim 11, further comprising instructions that when executed by the control circuitry cause the control circuitry to determine whether to provide contextual information about the subject by:
calculating, based on the count of episodes in the series of sequentially ordered episodes that are between the first episode and the second episode, a subject clarification score; and
determining that the subject clarification score is greater than a dynamic threshold, wherein the dynamic threshold is based on a user preference.

15. The non-transitory computer-readable medium of claim 11, further comprising instructions that when executed by the control circuitry cause the control circuitry to cause to be displayed the contextual information comprises causing to be displayed the contextual information within closed captions of the first episode.

* * * * *